(12) United States Patent
Yamaguchi

(10) Patent No.: US 12,401,266 B2
(45) Date of Patent: Aug. 26, 2025

(54) DC/DC CONVERTER, ELECTRONIC MODULE, AND ELECTRONIC APPARATUS

(71) Applicant: CANON KABUSHIKI KAISHA, Tokyo (JP)

(72) Inventor: Hiroyuki Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 18/324,060

(22) Filed: May 25, 2023

(65) Prior Publication Data

US 2023/0396154 A1    Dec. 7, 2023

(30) Foreign Application Priority Data

Jun. 1, 2022  (JP) ................. 2022-089697

(51) Int. Cl.
*H02M 1/14*    (2006.01)
*H02M 3/158*   (2006.01)

(52) U.S. Cl.
CPC ............ *H02M 1/14* (2013.01); *H02M 3/158* (2013.01)

(58) Field of Classification Search
CPC ................. H02M 1/14; H02M 3/158
See application file for complete search history.

(56) References Cited

U.S. PATENT DOCUMENTS

| 2004/0041543 | A1* | 3/2004 | Brooks | H02M 3/1584 |
| | | | | 323/212 |
| 2009/0153110 | A1* | 6/2009 | Huang | H02J 1/102 |
| | | | | 323/282 |
| 2015/0015219 | A1* | 1/2015 | Ishino | H02M 3/1584 |
| | | | | 323/271 |

FOREIGN PATENT DOCUMENTS

| JP | 2007202342 A | 8/2007 |
| JP | 2009005467 A | 1/2009 |
| JP | 2014226026 A | 12/2014 |
| JP | 2018057203 A | 4/2018 |
| JP | 2019106754 A | 6/2019 |

* cited by examiner

*Primary Examiner* — Rafael O De Leon Domenech
(74) *Attorney, Agent, or Firm* — Canon U.S.A., Inc. IP Division

(57) ABSTRACT

A DC/DC converter includes: multiple channels each including a switching circuit and an inductor; an output line having one end connected to the other end of the inductors of the multiple channels and the other end connected to a load; and a controller. The multiple channels include first to third channels, and the inductors of the first and second channels have a larger inductance value than the inductor of the third channel. When current flowing in the load is first current, the controller controls the switching circuits so that only the first channel is activated; and when the current flowing in the load is second current that is larger than the first current, the controller controls the switching circuits so that the first and second channels are operated in-phase and the third channel is operated in a phase different from the phase of the first and second channels.

23 Claims, 25 Drawing Sheets

— 318

— 311

······· 416   — · — · 417   ——— 418
— — — 419   — — · · 420

——— 421

— 421

— 413

······ 416    ---- 417    —— 418
--- 419    —·· 420

—— 421

DC/DC CONVERTER, ELECTRONIC MODULE, AND ELECTRONIC APPARATUS

BACKGROUND

Field

The present disclosure relates to a DC/DC converter, an electronic module, and an electronic apparatus.

Description of the Related Art

Japanese Patent Application Laid-Open No. 2014-226026 discloses a technology to improve efficiency in a light-load state of a multiphase DC/DC converter. In the technology disclosed in Japanese Patent Application Laid-Open No. 2014-226026, the inductance of an inductor of a single channel is set to a different value from inductances of inductors of the remaining channels so that high efficiency can be obtained in the lightest-load state where only the single channel is active.

In the technology disclosed in Japanese Patent Application Laid-Open No. 2014-226026, however, there is a problem of increased ripple noise in the output voltage in a state where several channels of the multiphase DC/DC converter are activated and a large load current flows in the load.

SUMMARY

Various embodiments of the present disclosure have been made in view of the above problem and provide a DC/DC converter that can reduce ripple noise in the output voltage regardless of the level of load current According to one embodiment of the present disclosure, there is provided a DC/DC converter including: an input line supplied with a DC voltage; a plurality of channels each including a switching circuit and an inductor, one end of the inductor being connected to the input line via the switching circuit; an output line, one end of the output line being connected to the other end of the inductors of the plurality of channels, and the other end of the output line being connected to a load; and a controller that controls the switching circuits of the plurality of channels, wherein the plurality of channels include at least a first channel, a second channel, and a third channel, wherein the inductors of the first and second channels have a larger inductance value than the inductor of the third channel, wherein when current flowing in the load is first current, the controller controls the switching circuits of the first to third channels so that only the first channel is activated and the second and third channels are deactivated, and wherein when the current flowing in the load is second current that is larger than the first current, the controller controls the switching circuits of the first to third channels so that the first and second channels are operated in-phase and the third channel is operated in a phase different from the phase of the first and second channels.

Further features of the present disclosure will become apparent from the following description of exemplary embodiments with reference to the attached drawings.

DESCRIPTION OF THE EMBODIMENTS

[Reference Technology]

Figure 1A:
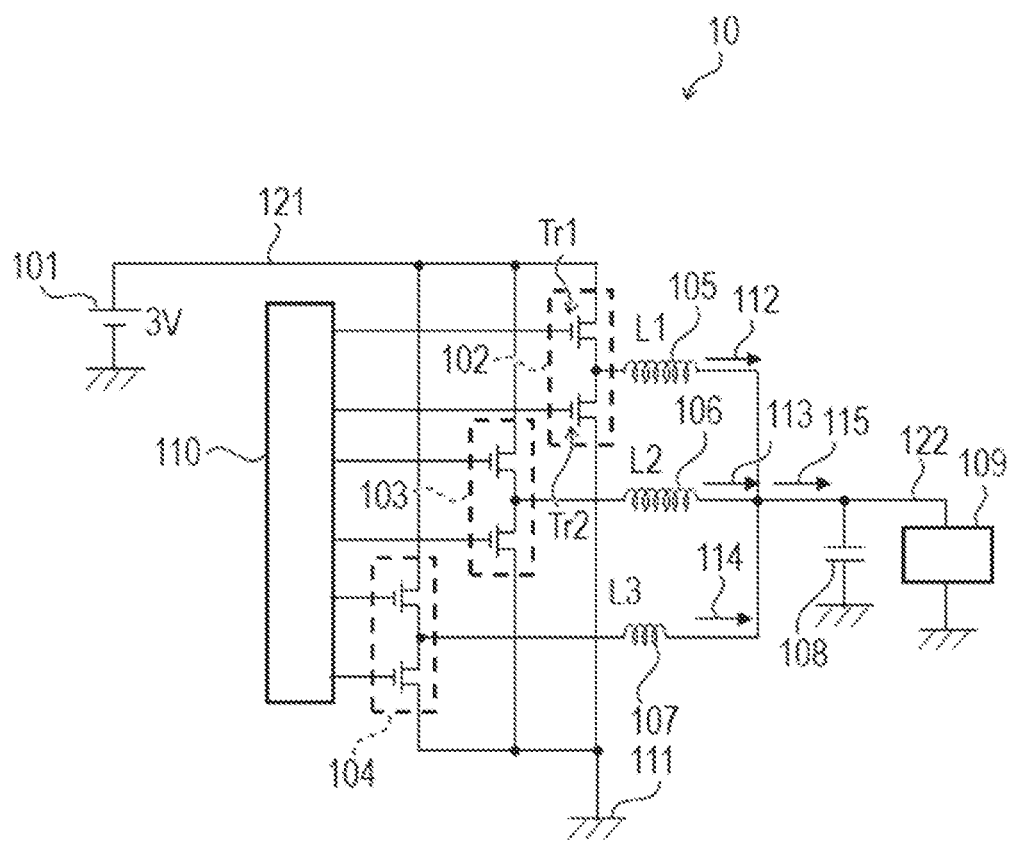
FIG. 1A is a circuit diagram illustrating a circuit of a DC/DC converter according to a first embodiment of the present disclosure.

Electronic modules mounted on electronic apparatuses each have a printed wiring board, a semiconductor apparatus implemented on the printed wiring board, and a power source circuit that supplies power to the semiconductor apparatus. In recent years, an increase in the amount of data processing per unit time has caused an increase in the amount of current required for the semiconductor apparatus to operate. Thus, DC/DC converters that do not cause a significant increase in the loss even with an increased amount of current are utilized as the power source circuit. While DC/DC converters have high efficiency, ripple noise is superimposed on the output voltage due to switching operations to control the levels of the output current and the output voltage. Advancement of semiconductor technologies and an increased demand for lower power consumption have led to continuous decrease in operation voltages of semiconductor apparatuses. Due to such a decrease in voltages, the amount of tolerant noise that is set for avoiding a malfunction of semiconductor apparatuses has also decreased, and DC/DC converters are thus required not only to increase efficiency but also to reduce ripple noise.

Among semiconductor apparatuses, in a central processing unit (CPU), a graphics processing unit (GPU), a digital signal processor (DSP), or the like, the operation current decreases to a value close to zero in a standby state, and in contrast, the operation current significantly increases in accordance with an amount of data processing in an operating state. That is, the output current (load current) of a DC/DC converter will significantly vary within a range from several mA to several A. To address such a large dynamic range of load current, the multiphase DC/DC converter as disclosed in Japanese Patent Application Laid-Open No. 2014-226026 formed of a plurality of DC/DC converters connected in parallel is utilized. Such a multiphase DC/DC converter addresses the increase and decrease in the amount of current by activating only one DC/DC converter when the load such as a CPU or the like is in a standby state and activating all the DC/DC converters in a full operating state. In a standby state of semiconductor apparatuses, since only one DC/DC converter is activated, there is an advantage that the switching loss can be suppressed low. In addition, in a full operating state where all the DC/DC converters are activated, there is an advantageous effect that the total ripple noise is reduced by activating respective converters with shifted phases to cancel respective ripple noise to each other.

When semiconductor apparatuses are in a standby state or the like, however, there is a problem of larger ripple noise than in a full operating state, because the above cancelling effect is not obtained when only a single DC/DC converter is activated. Accordingly, Japanese Patent Application Laid-Open No. 2014-226026 discloses a technology that can reduce ripple noise even when only a single DC/DC converter is activated, such as in a standby state. Specifically, in Japanese Patent Application Laid-Open No. 2014-226026, only the inductance value of the output inductor component of a DC/DC converter which is activated in a standby state of semiconductor apparatuses is set to a larger value, thereby the amplitude of current occurring due to a switching operation is reduced, and the ripple noise is reduced.

As reference technologies, a general multiphase DC/DC converter and the multiphase DC/DC converter disclosed in Japanese Patent Application Laid-Open No. 2014-226026 will be described with reference to FIG. 7A to FIG. 7H.

Figure 7A:
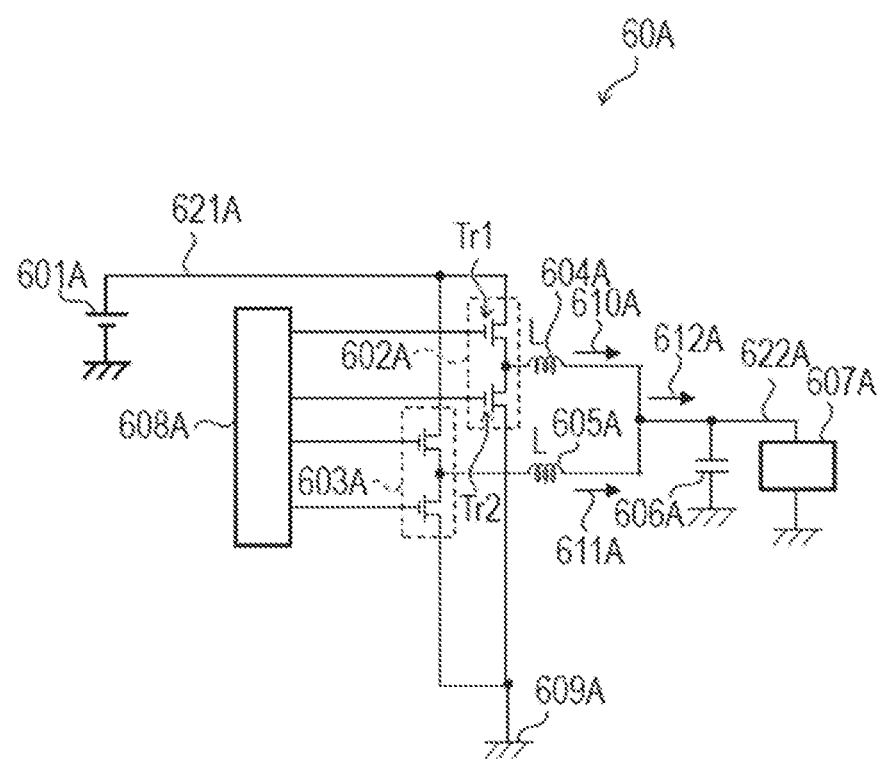
FIG. 7A is a circuit diagram illustrating a circuit of a general multiphase DC/DC converter.

FIG. 7A is a circuit diagram illustrating an example of a circuit of a general multiphase DC/DC converter. The example illustrated in FIG. 7A represents a two-phase circuit. As illustrated in FIG. 7A, a DC/DC converter 60A that is a general multiphase DC/DC converter has switching circuits 602A, 603A, inductors 604A, 605A, a capacitor 606A, and a controller 608A. Further, the DC/DC converter 60A has an input line 621A and an output line 622A.

The input line 621A is a wiring supplied with a direct current (DC) voltage from an input voltage source 601A. The input voltage source 601A is connected to one end of the input line 621A. The input voltage source 601A supplies a DC voltage to the input line 621A. The input voltage source 601A is not particularly limited and may be a power supply that supplies a DC voltage converted from alternating current (AC) power supplied from a commercial power supply or may be a battery, for example. The switching circuits 602A, 603A are connected in parallel to the other end of the input line 621A via wirings.

The switching circuits 602A, 603A are each formed of a complementary metal oxide semiconductor (CMOS) inverter having a P-type metal oxide semiconductor (MOS) transistor Tr1 and an N-type MOS transistor Tr2. In each of the switching circuits 602A, 603A, the source of the P-type MOS transistor Tr1 is connected to the other end of the input line 621A via a wiring. Further, the source of the N-type MOS transistor Tr2 is connected to a reference potential 609A, which is a ground potential, via a wiring. Furthermore, the gate of the P-type MOS transistor Tr1 and the gate of the N-type MOS transistor Tr2 are connected to the controller 608A via wirings. Further, the drain of the P-type MOS transistor Tr1 and the drain of the N-type MOS transistor Tr2 of the switching circuit 602A are connected to each other and connected as the output terminal to one end of the inductor 604A via a wiring. The drain of the P-type MOS transistor Tr1 and the drain of the N-type MOS transistor Tr2 of the switching circuit 603A are connected to each other and connected as the output terminal to one end of the inductor 605A via a wiring.

The controller 608A is a control unit that controls switching operations of the switching circuits 602A, 603A to switch on and off the switching circuits 602A, 603A. The controller 608A controls the switching operation by controlling the voltages supplied to the gates of the P-type MOS transistors Tr1 and the gates of the N-type MOS transistors Tr2 of the switching circuits 602A, 603A.

The inductors 604A, 605A are inductors having the same inductance value L each other. The other end of the inductor 604A and the other end of the inductor 605A are connected to each other via wirings and connected to one end of the output line 622A. In FIG. 7A, current 610A illustrated by an arrow represents current occurring in a wiring connected between the other end of the inductor 604A and one end of the output line 622A. Current 611A illustrated by an arrow represents current occurring in a wiring connected between the other end of the inductor 605A and one end of the output line 622A.

The output line 622A is a wiring for supplying a DC voltage to a load 607A such as a semiconductor apparatus or the like. The load 607A is connected to the other end of the output line 622A. The capacitor 606A is connected between the output line 622A and the reference potential 609A via wirings. In FIG. 7A, current 612A illustrated by an arrow represents current occurring in the output line 622A upstream of the capacitor 606A.

The DC/DC converter 60A switches on and off the power, which is supplied from the input voltage source 601A to the input line 621A, through switching operations of the switching circuits 602A, 603A to feed the power to the downstream inductors 604A, 605A. Furthermore, the DC/DC converter 60A smooths power fed through the inductors 604A, 605A at the capacitor 606A to supply a desired constant voltage to the load 607A. At this time, the controller 608A controls timings of the switching operations of the switching circuits 602A, 603A. Herein, the switching circuit 602A and the inductor 604A form a unit of configuration that functions as a single DC/DC converter. The switching circuit 603A and the inductor 605A also form a unit of configuration that functions as a single DC/DC converter. Such units of configuration are each referred to as a channel. The DC/DC converter 60A has a first channel formed of the switching circuit 602A and the inductor 604A and a second channel formed of the switching circuit 603A and the inductor 605A. The switching circuits 602A, 603A in respective channels are operated at the same switching frequency. The frequency is several MHz in general.

Figure 7B:
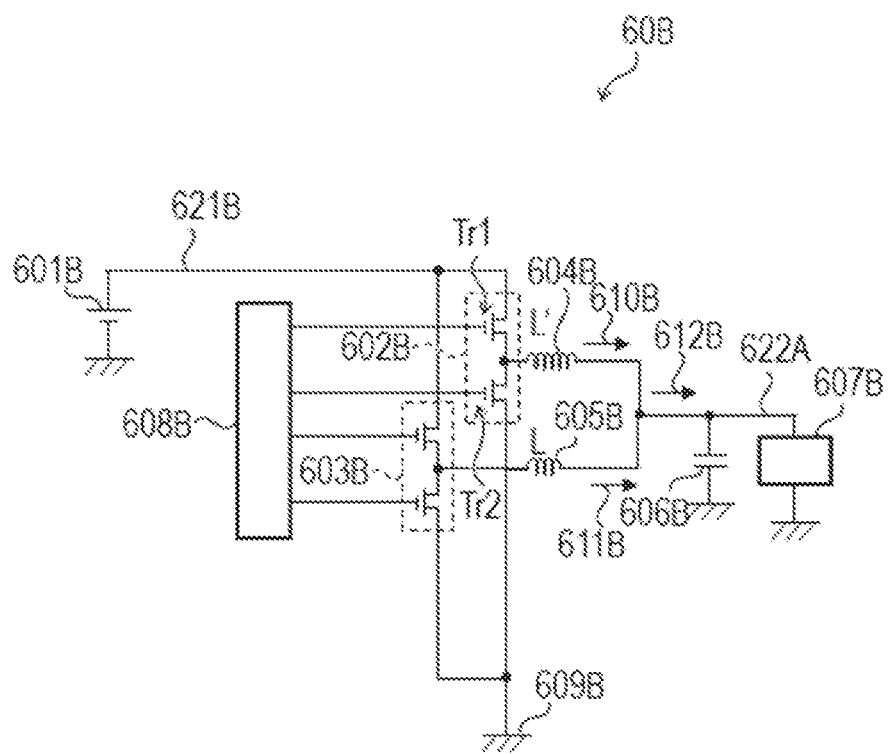
FIG. 7B is a circuit diagram illustrating the circuit of the multiphase DC/DC converter disclosed in Japanese Patent Application Laid-Open No. 2014-226026.

On the other hand, FIG. 7B is a circuit diagram illustrating the circuit of the multiphase DC/DC converter disclosed in Japanese Patent Application Laid-Open No. 2014-226026. As illustrated in FIG. 7B, the DC/DC converter 60B that is the multiphase DC/DC converter disclosed in Japanese Patent Application Laid-Open No. 2014-226026 has a configuration corresponding to the DC/DC converter 60A illustrated in FIG. 7A. In FIG. 7B, components corresponding to the components illustrated in FIG. 7A are illustrated with the alphabet of the references being changed from A to B. The DC/DC converter 60B differs from the DC/DC converter 60A in that an inductor 604B has an inductance value L' that is larger than the inductance value L of the inductor 605B.

Figure 7C:
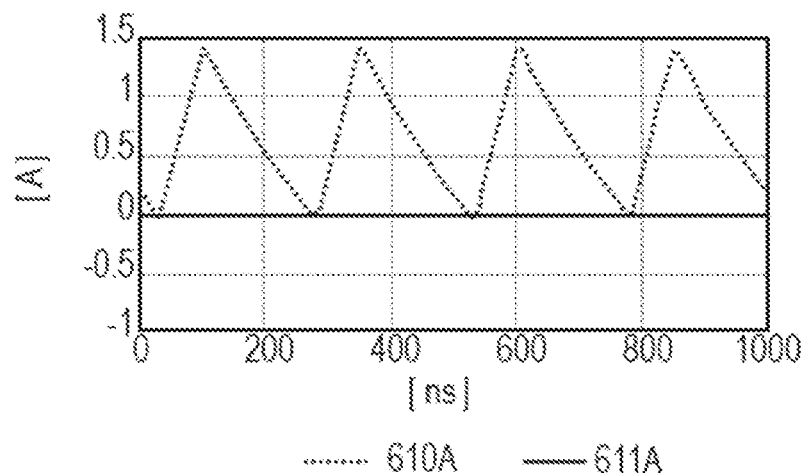
FIG. 7C is a diagram illustrating an operation waveform of the general multiphase DC/DC converter when only a single channel is activated.
Figure 7D:
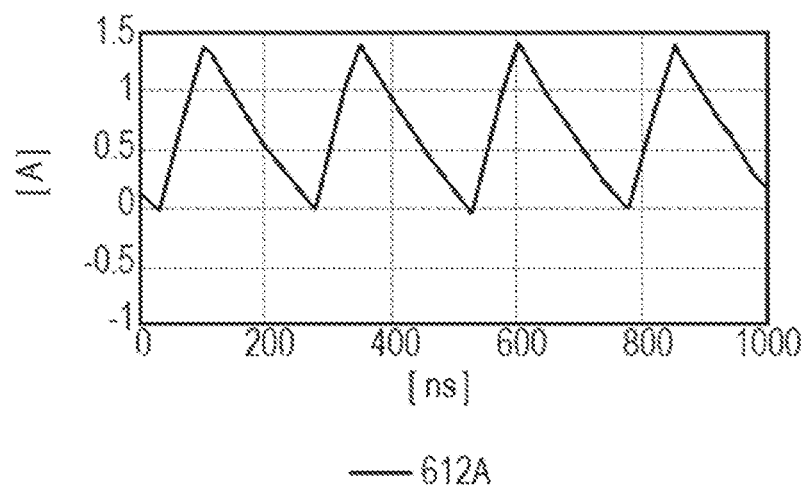
FIG. 7D is a diagram illustrating an operation waveform of the general multiphase DC/DC converter when only a single channel is activated.
Figure 7E:
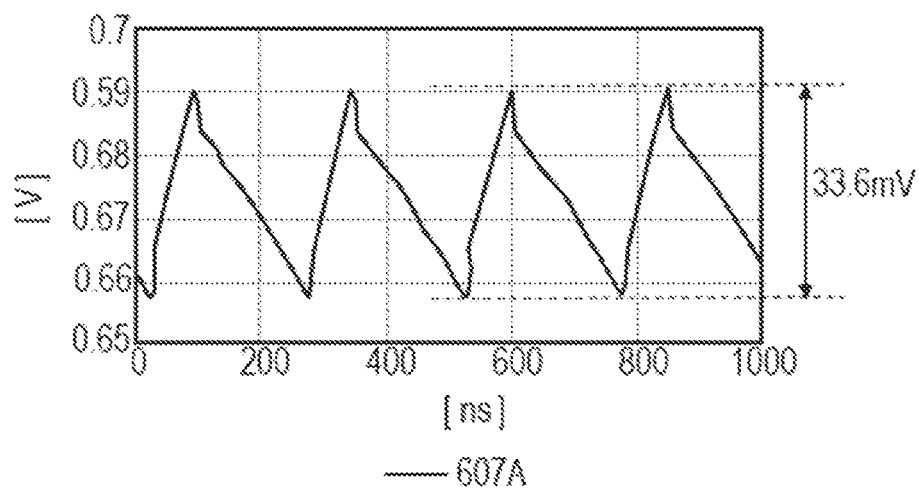
FIG. 7E is a diagram illustrating an operation waveform of the general multiphase DC/DC converter when only a single channel is activated.
Figure 7F:
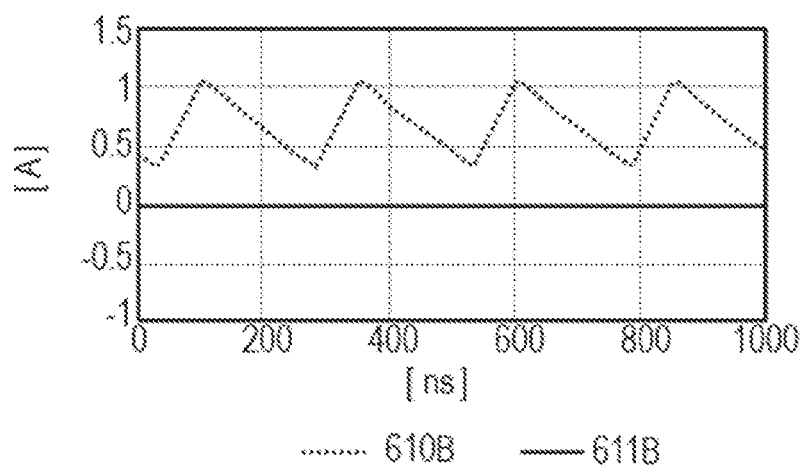
FIG. 7F is a diagram illustrating an operation waveform of the multiphase DC/DC converter disclosed in Japanese Patent Application Laid-Open No. 2014-226026 when only a single channel is activated.
Figure 7G:
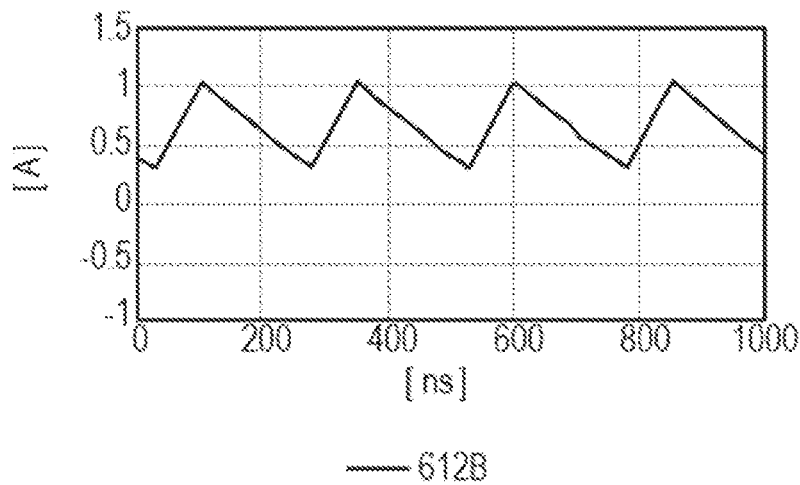
FIG. 7G is a diagram illustrating an operation waveform of the multiphase DC/DC converter disclosed in Japanese Patent Application Laid-Open No. 2014-226026 when only a single channel is activated.
Figure 7H:
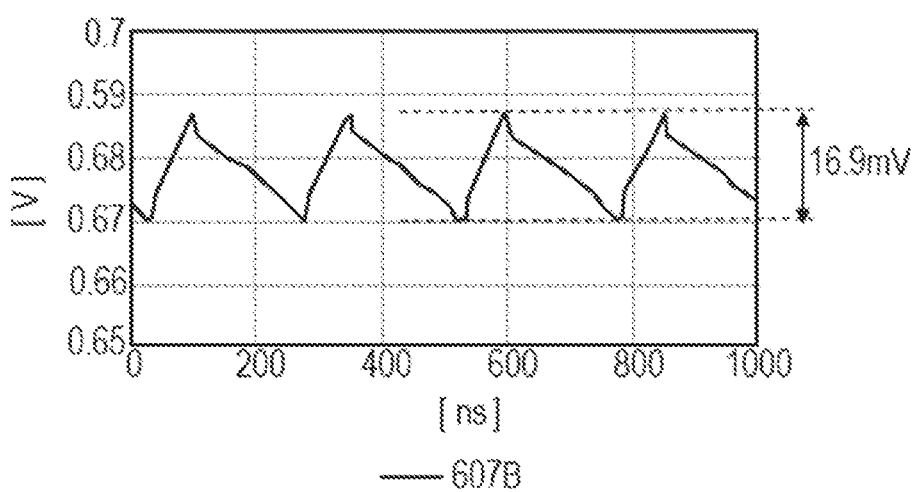
FIG. 7H is a diagram illustrating an operation waveform of the multiphase DC/DC converter disclosed in Japanese Patent Application Laid-Open No. 2014-226026 when only a single channel is activated.

Next, waveforms of the current and the voltage in the DC/DC converters 60A, 60B when only a single channel is activated, such as when a semiconductor apparatus that is a load is in a standby state or the like, will be described with reference to FIG. 7C to FIG. 7H. FIG. 7C, FIG. 7D, and FIG. 7E illustrate waveforms of the current 610A, 611A of the inductors 604A, 605A of respective channels, the current 612A upstream of the capacitor 606A, and the voltage of the load 607A in the DC/DC converter 60A illustrated in FIG. 7A, respectively. FIG. 7F, FIG. 7G, and FIG. 7H illustrate waveforms of the current 610B, 611B of the inductors 604B, 605B of respective channels, the current 612B upstream of the capacitor 606B, and the voltage of the load 607B in the DC/DC converter 60B illustrated in FIG. 7B, respectively. Herein, for waveform analysis of the current and the voltage, a circuit simulator PSpice by Cadence Design Systems was used. Circuit conditions for the waveform analysis were that the voltages of the input voltage sources 601A, 601B were 3 V, the inductance values L, L' were 0.1 µH, 0.2 µH, respectively, and the switching frequency was 4 MHz. Further, in the waveform analysis, the first channel was operated as the single channel.

As can be seen from FIG. 7C and FIG. 7F, in comparison between the current 610A, 610B of the first channel, the current 610B associated with the larger inductance value has a smaller amplitude than the current 610A. At this time, since only one channel is activated, the current 610A directly becomes the current 612A, and the current 610B directly becomes the current 612B. In such cases, in the DC/DC converter 60A, a ripple voltage including ripple noise occurs in the voltage of the load 607A as a product of the current 612A and the impedance of the capacitor 606A. Similarly, in the DC/DC converter 60B, a ripple voltage including ripple noise occurs in the voltage of the load 607B as a product of the current 612B and the impedance of the capacitor 606B. The amplitude of the ripple voltage in the DC/DC converter 60B is 16.9 mV as indicated in FIG. 7H, which means a reduction to approximately a half the amplitude of 33.6 mV of the ripple voltage indicated in FIG. 7E.

Figure 7I:
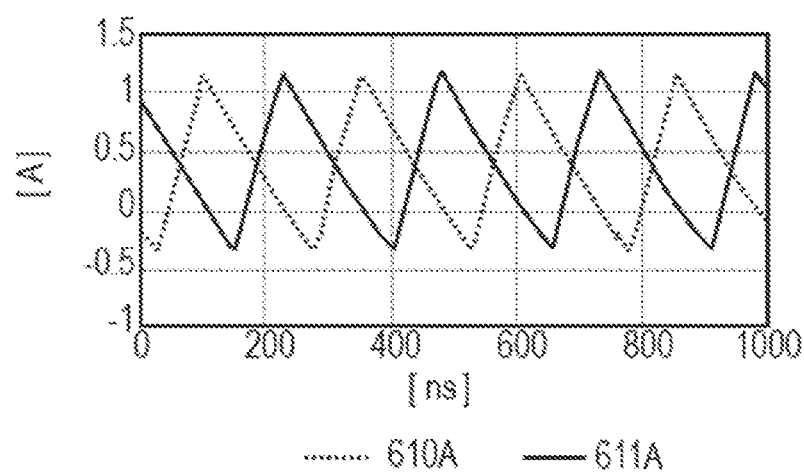
FIG. 7I is a diagram illustrating an operation waveform of a general multiphase DC/DC converter when multiple channels are activated.
Figure 7J:
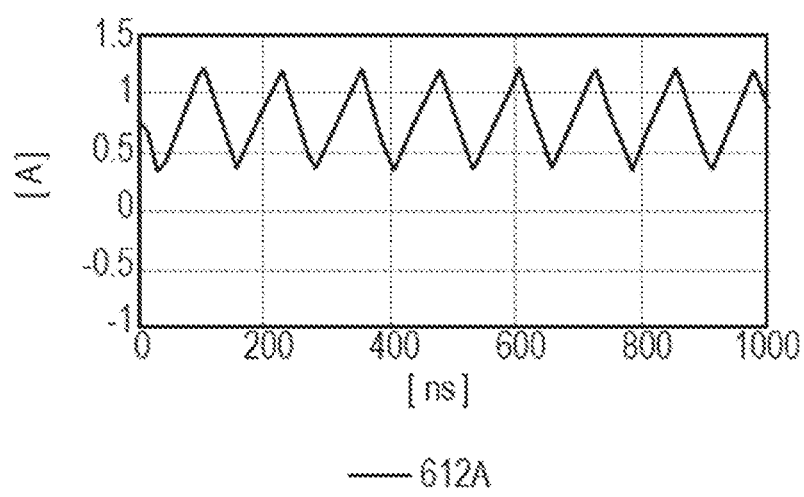
FIG. 7J is a diagram illustrating an operation waveform of the general multiphase DC/DC converter when multiple channels are activated.
Figure 7K:
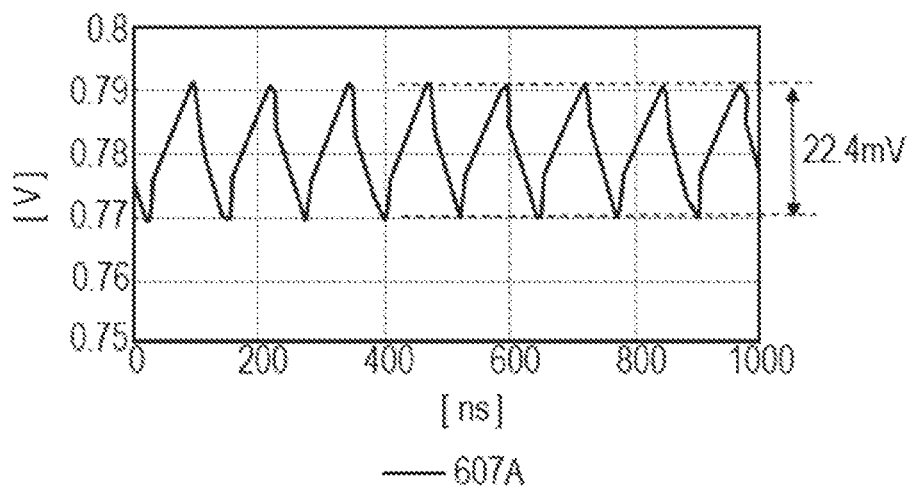
FIG. 7K is a diagram illustrating an operation waveform of the general multiphase DC/DC converter when multiple channels are activated.
Figure 7L:
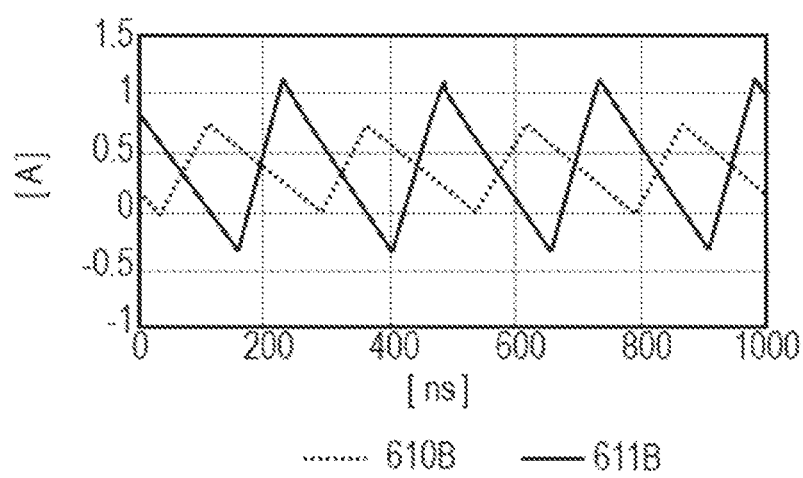
FIG. 7L is a diagram illustrating an operation waveform of the multiphase DC/DC converter disclosed in Japanese Patent Application Laid-Open No. 2014-226026 when multiple channels are activated.
Figure 7M:
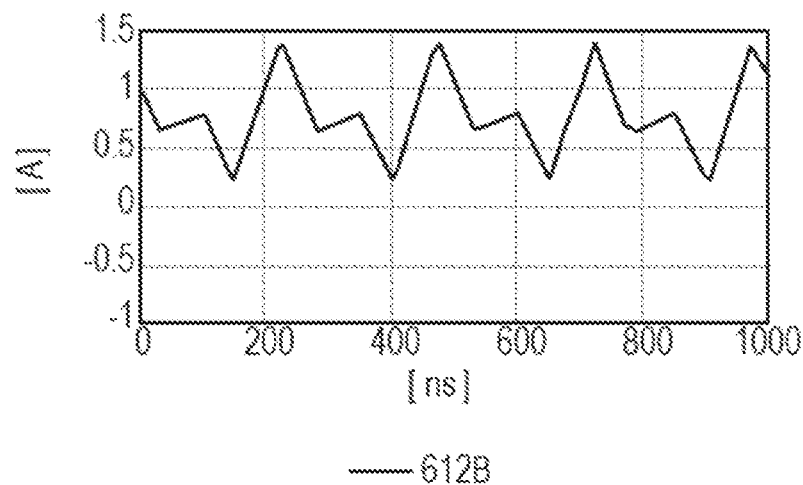
FIG. 7M is a diagram illustrating an operation waveform of the multiphase DC/DC converter disclosed in Japanese Patent Application Laid-Open No. 2014-226026 when multiple channels are activated.
Figure 7N:
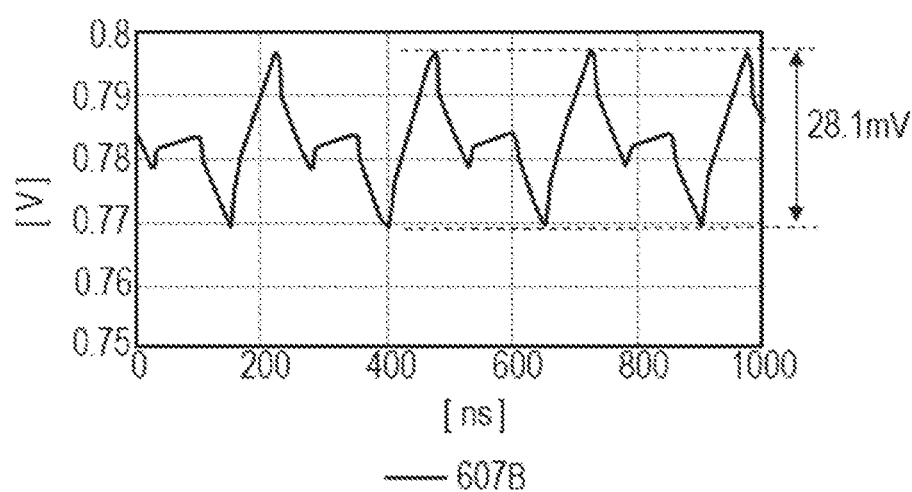
FIG. 7N is a diagram illustrating an operation waveform of the multiphase DC/DC converter disclosed in Japanese Patent Application Laid-Open No. 2014-226026 when multiple channels are activated.

Next, waveforms of the current and the voltage in the DC/DC converters 60A, 60B when multiple channels are activated, such as when a semiconductor apparatus is in a full operating state or the like, will be described with reference to FIG. 7I to FIG. 7N. FIG. 7I, FIG. 7J, and FIG. 7K illustrate waveforms of the current 610A, 611A of the inductors 604A, 605A of respective channels, the current 612A upstream of the capacitor 606A, and the voltage of the load 607A in the DC/DC converter 60A illustrated in FIG. 7A, respectively. FIG. 7L, FIG. 7M, and FIG. 7N illustrate waveforms of the current 610B, 611B of the inductors 604B, 605B of respective channels, the current 612B upstream of the capacitor 606B, and the voltage of the load 607B in the DC/DC converter 60B illustrated in FIG. 7B, respectively. The waveform analysis of the current and the voltage was performed under the same condition as above except that the first channel and the second channel are activated.

As can be seen from FIG. 7I, FIG. 7J, and FIG. 7K, in the DC/DC converter 60A that is the general multiphase DC/DC converter illustrated in FIG. 7A, the current 610A, 611A flows with the same amplitude and a phase difference of 180 degrees. Thus, because of the cancelling effect on both the current 610A, 611A, the current 612A that is a combination thereof has a suppressed, small amplitude as illustrated in FIG. 7J. As a result, the voltage of the load 607A has a suppressed, small amplitude as illustrated in FIG. 7K.

In contrast, as can be seen from FIG. 7L, in the case of the DC/DC converter 60B that is the multiphase DC/DC converter disclosed in Japanese Patent Application Laid-Open No. 2014-226026 illustrated in FIG. 7B, the amplitudes of the current 610B, 611B differ from each other. Thus, the cancelling effect on the current 610B, 611B is smaller, and as illustrated in FIG. 7M, the amplitude of the current 612B that is a combination of the current 610B, 611B is larger. As a result, as illustrated in FIG. 7N, the ripple voltage appearing at the load 607B is larger.

As discussed above, in the general multiphase DC/DC converter and the multiphase DC/DC converter disclosed in Japanese Patent Application Laid-Open No. 2014-226026, it is difficult to reduce ripple noise in the output voltage regardless of the level of load current. In contrast, DC/DC converters according to first to fourth embodiments of the present disclosure can reduce ripple noise in the output voltage regardless of the level of load current. The DC/DC converter according to each embodiment will be described below. Note that the DC/DC converter according to each embodiment is a multiphase DC/DC converter.

First Embodiment

A DC/DC converter 10 according to the first embodiment of the present disclosure will be described with reference to FIG. 1A to FIG. 1D. Note that, in the description, FIG. 7L and FIG. 7N illustrating waveforms of the current and the voltage in the DC/DC converter 60B that is the multiphase DC/DC converter disclosed in Japanese Patent Application Laid-Open No. 2014-226026 illustrated in FIG. 7B described above will be used for comparison.

First, the configuration of the DC/DC converter 10 according to the present embodiment will be described with reference to FIG. 1A. FIG. 1A is a circuit diagram illustrating the circuit of the DC/DC converter 10 according to the present embodiment. The DC/DC converter 10 according to the present embodiment is a two-phase DC/DC converter.

As illustrated in FIG. 1A, the DC/DC converter 10 according to the present embodiment has switching circuits 102, 103, 104, inductors 105, 106, 107, a capacitor 108, and a controller 110. Further, the DC/DC converter 10 has an input line 121 and an output line 122.

The input line 121 is a wiring supplied with a DC voltage from an input voltage source 101. The input voltage source 101 is connected to one end of the input line 121. The input voltage source 101 supplies a DC voltage to the input line 121. The input voltage source 101 is not particularly limited and may be a power supply that supplies a DC voltage converted from AC power supplied from a commercial power supply or may be a battery, for example. The switching circuits 102, 103, 104 are connected in parallel to the other end of the input line 121 via wirings.

The switching circuits 102, 103, 104 are each formed of a CMOS inverter having a P-type MOS transistor Tr1 and an N-type MOS transistor Tr2. In each of the switching circuits 102, 103, 104, the source of the P-type MOS transistor Tr1 is connected to the other end of the input line 121 via a wiring. Further, the source of the N-type MOS transistor Tr2 is connected to a reference potential 111, which is the ground potential, via a wiring. Furthermore, the gate of the P-type MOS transistor Tr1 and the gate of the N-type MOS transistor Tr2 are connected to the controller 110 via wirings. Further, the drain of the P-type MOS transistor Tr1 and the drain of the N-type MOS transistor Tr2 of the switching circuit 102 are connected to each other and connected as the output terminal to one end of the inductor 105 via a wiring. The drain of the P-type MOS transistor Tr1 and the drain of the N-type MOS transistor Tr2 of the switching circuit 103 are connected to each other and connected as the output terminal to one end of the inductor 106 via a wiring. The drain of the P-type MOS transistor Tr1 and the drain of the N-type MOS transistor Tr2 of the switching circuit 104 are connected to each other and connected as the output terminal to one end of the inductor 107 via a wiring. Note that the switching circuits 102, 103, 104 are not limited to those formed of CMOS inverters and may take other forms.

The controller 110 is a control unit that controls switching operations of the switching circuits 102, 103, 104 to switch on and off the switching circuits 102, 103, 104. The controller 110 controls the switching operation by controlling the voltages supplied to the gates of the P-type MOS transistors Tr1 and the gates of the N-type MOS transistors Tr2 of the switching circuits 102, 103, 104.

The inductors 105, 106, 107 have inductance values L1, L2, L3, respectively. Herein, the inductance values L1, L2 are larger than the inductance value L3. The inductance values L1, L2 may be the same or may be different from each other. The other end of the inductor 105, the other end of the inductor 106, and the other end of the inductor 107 are connected to each other via wirings and connected to one end of the output line 122. In FIG. 1A, current 112 illustrated by an arrow represents current occurring in a wiring connected between the other end of the inductor 105 and one end of the output line 122. Current 113 illustrated by an arrow represents current occurring in a wiring connected between the other end of the inductor 106 and one end of the output line 122. Current 114 illustrated by an arrow represents current occurring in a wiring connected between the other end of the inductor 107 and one end of the output line 122.

The output line 122 is a wiring for supplying a DC voltage to a load 109 such as a semiconductor apparatus or the like. The load 109 is connected to the other end of the output line 122. The capacitor 108 is connected between the output line 122 and the reference potential 111 via wirings. In FIG. 1A, current 115 illustrated by an arrow represents current occurring in the output line 122 upstream of the capacitor 108.

The DC/DC converter 10 switches on and off the power, which is supplied from the input voltage source 101 to the input line 121, through switching operations of the switching circuits 102, 103, 104 to feed the power to the downstream inductors 105, 106, 107. Furthermore, the DC/DC converter 10 smooths power fed through the inductors 105, 106, 107 at the capacitor 108 to supply a desired constant voltage to the load 109. At this time, the controller 110 controls timings of the switching operations of the switching circuits 102, 103, 104.

The switching circuit 102 and the inductor 105 form a first channel, which is a unit of configuration that functions as a DC/DC converter. The switching circuit 103 and the inductor 106 form a second channel, which is a unit of configuration that functions as a DC/DC converter. The switching circuit 104 and the inductor 107 form a third channel, which is a unit of configuration that functions as a DC/DC converter. The DC/DC converter 10 has three channels of the first channel, the second channel, and the third channel.

In a case of a light-load state, such as when the load 109 is in a standby state or the like, only the first channel formed of the switching circuit 102 and the inductor 105 is activated in the DC/DC converter 10. In the case of the light-load state, first current flows in the load 109 as the load current in accordance with the state of the load 109. In the case of the light-load state, the controller 110 controls the switching circuits 102, 103, 104 so that only the first channel is activated and the second and third channels are deactivated.

On the other hand, in a case of a heavy-load state where the load is heavier than in the light-load state, such as when the load 109 is in a full operating state or the like, all the channels of the first channel, the second channel, and the third channel are activated in the DC/DC converter 10. In the case of the heavy-load state, second current that is larger than the first current flows as the load current in the load 109 in accordance with the state of the load 109. Specifically, in such a case, the first channel formed of the switching circuit 102 and the inductor 105 and the second channel formed of the switching circuit 103 and the inductor 106 are operated in-phase. In contrast, the third channel formed of the switching circuit 104 and the inductor 107 is operated with a phase difference of 180 degrees relative to the first and second channels. In the case of the heavy-load state, the controller 110 controls the switching circuits 102, 103, 104 so that the first and second channels are operated in-phase and the third channel is operated with a phase difference of 180 degrees relative to the first and second channels.

It is preferable that the inductance value L1 of the inductor 105 of the first channel, the inductance value L2 of the inductor 106 of the second channel, and the inductance value L3 of the inductor 107 of the third channel satisfy the following Expression (1).

$$L3=(L1\times L2)/(L1+L2) \quad \text{Expression (1)}$$

When the inductance values L1, L2, L3 satisfy Expression (1), ripple noise can be more effectively reduced due to a cancelling effect between flows of current in a case of a heavy-load state as described later.

Figure 1B:
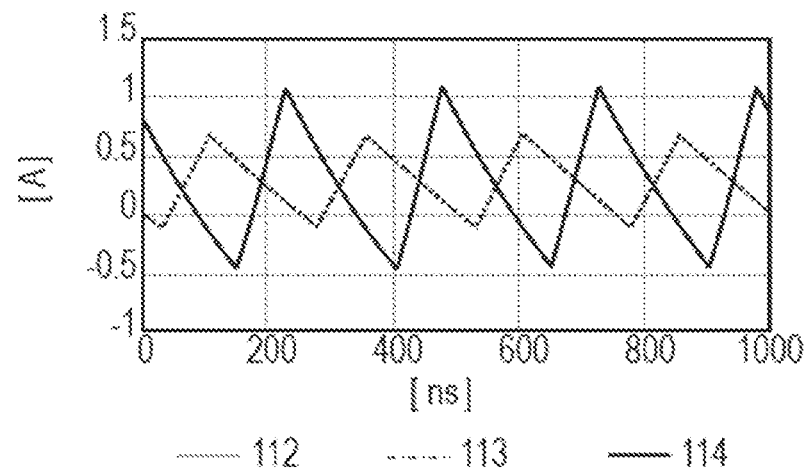
FIG. 1B is a diagram illustrating an example of an operation waveform of the DC/DC converter according to the first embodiment of the present disclosure.
Figure 1C:
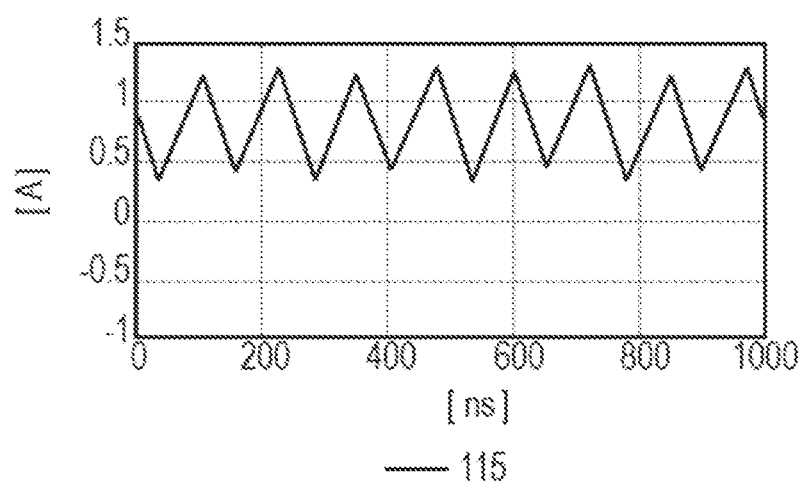
FIG. 1C is a diagram illustrating an example of an operation waveform of the DC/DC converter according to the first embodiment of the present disclosure.
Figure 1D:
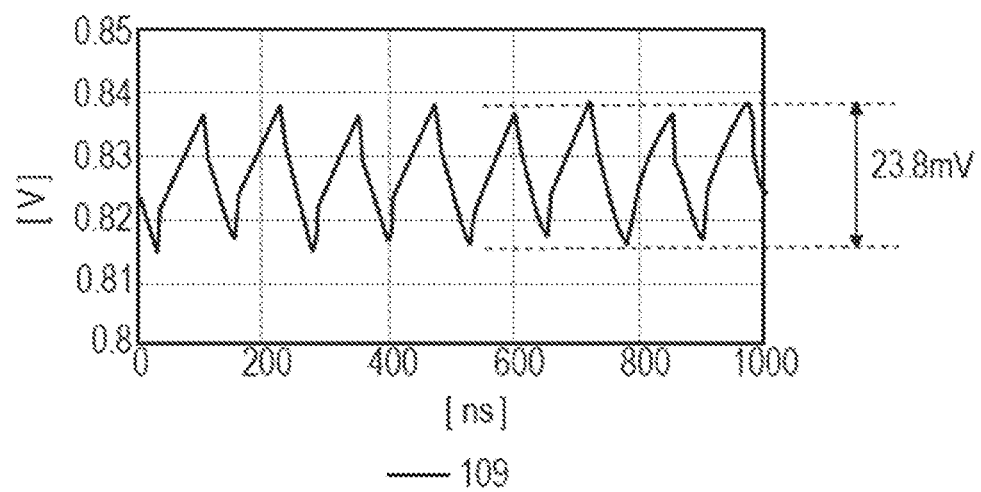
FIG. 1D is a diagram illustrating an example of an operation waveform of the DC/DC converter according to the first embodiment of the present disclosure.

Next, the current of each part of the DC/DC converter 10 and the voltage of the load 109 according to the present embodiment illustrated in FIG. 1A will be described with reference to FIG. 1B, FIG. 1C, and FIG. 1D. FIG. 1B, FIG. 1C, and FIG. 1D illustrate examples of operation waveforms of the DC/DC converter 10 illustrated in FIG. 1A. FIG. 1B, FIG. 1C, and FIG. 1D illustrate waveforms of the current 112, 113, 114 of the inductors 105, 106, 107 of respective channels, the current 115 upstream of the capacitor 108, and the voltage of the load 109 of the DC/DC converter 10. The waveforms illustrated in FIG. 1B, FIG. 1C, and FIG. 1D are waveforms in a heavy-load state, such as when the load 109 is in a full operating state or the like. Herein, for waveform analysis of the current and the voltage, the circuit simulator PSpice by Cadence Design Systems was used. Circuit conditions for the waveform analysis were that the voltage of the input voltage source 101 was 3 V, the inductance values L1 and L2 of the inductors 105, 106 each were 0.2 µH, the inductance value L3 of the inductor 107 was 0.1 µH, and the switching frequency was 4 MHz.

In the DC/DC converter 10, in the heavy-load state, the switching circuits 102, 103 are operated in synchronization, and the switching circuit 104 is operated with a phase difference of 180 degrees from the switching circuits 102, 103.

As illustrated in FIG. 1, the current 112, 113 has a waveform having half the amplitude of the current 114 and a phase difference of 180 degrees therefrom. In FIG. 1i, the current 112 and the current 113 overlap each other. Therefore, the combined current of the current 112 and the current 113 has a waveform having the same amplitude as the current 114 and a phase difference of 180 degrees therefrom. Thus, due to the cancelling effect between the flows of current, as illustrated in FIG. 1C, the current 115 has a smaller amplitude than the conventional current 612B illustrated in FIG. 7M. As a result, in the present embodiment, ripple noise in the voltage of the load 109 is reduced not only in a case of a light-load state but also in a case of a heavy-load state. While the ripple noise of the conventional DC/DC converter 60B illustrated in FIG. 7N is 28.1 mV, the ripple noise is reduced to 23.8 mV in the present embodiment as illustrated in FIG. 1D. According to the present embodiment, the ripple noise in a heavy-load state can be reduced without impairing the effect of ripple noise reduction in a light-load state compared to the conventional example.

In the present embodiment, since the amplitude of current is suppressed low due to the inductor 105 having a larger inductance value in a case of a light-load state, such as when the load 109 is in a standby state or the like, the ripple noise is reduced. On the other hand, in a case of a heavy-load state where the load is heavier than in the light-load state, such as when the load 109 is in a full operating state or the like, the first and second channels are operated in synchronization. Accordingly, the amplitude of the combined current of the first and second channels is close to or equal to the amplitude of the current of the third channel operated in a different phase from the first and second channel. Thus, in the case of the heavy-load state, ripple noise can be reduced by the cancelling effect between the flows of current. In such a way, according to the present embodiment, ripple noise in the output voltage can be reduced regardless of the level of load current. Note that, although the inductances L1, L2 were the same values in the waveform analysis described above, ripple noise can be reduced even when L1 and L2 are different values from each other as long as both the values are larger than L3. Further, when the value of L1 is larger than the value of L2, ripple noise in a light-load state can be reduced, and it is therefore preferable that the value of L1 be larger than the value of L2.

Second Embodiment

Figure 2:
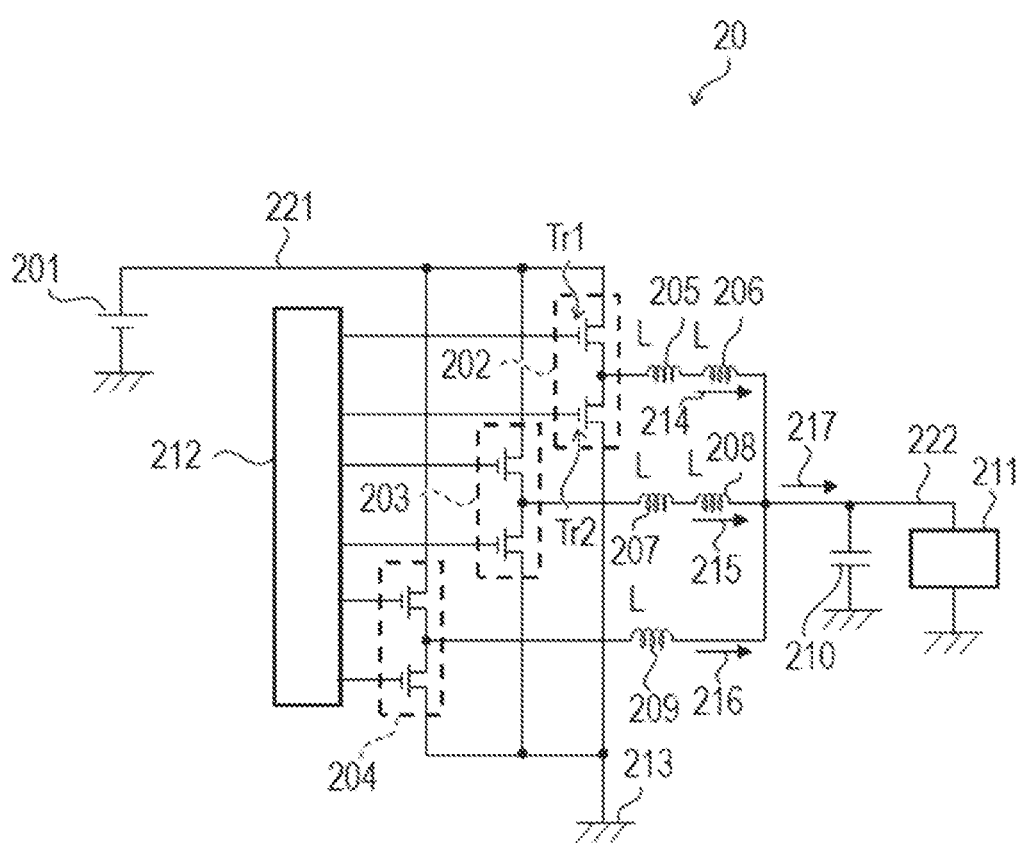
FIG. 2 is a circuit diagram illustrating a circuit of a DC/DC converter according to a second embodiment of the present disclosure.

A DC/DC converter 20 according to the second embodiment of the present disclosure will be described with reference to FIG. 2. FIG. 2 is a circuit diagram illustrating the circuit of the DC/DC converter 20 according to the present embodiment.

As illustrated in FIG. 2, the DC/DC converter 20 according to the present embodiment has switching circuits 202, 203, 204, inductors 205, 206, 207, 208, 209, a capacitor 210, and a controller 212. Further, the DC/DC converter 20 has an input line 221 and an output line 222.

The input line 221 is a wiring supplied with a DC voltage from an input voltage source 201. The input voltage source 201 is connected to one end of the input line 221. The input voltage source 201 is the same as the input voltage source 101. The switching circuits 202, 203, 204 are connected in parallel to the other end of the input line 221 via wirings.

The switching circuits 202, 203, 204 are each formed of a CMOS inverter in the same manner as the switching circuits 102, 103, 104. In each of the switching circuits 202, 203, 204, the source of the P-type MOS transistor Tr1 is connected to the other end of the input line 221 via a wiring. Further, the source of the N-type MOS transistor Tr2 is connected to a reference potential 213, which is the ground potential, via a wiring. Furthermore, the gate of the P-type MOS transistor Tr1 and the gate of the N-type MOS transistor Tr2 are connected to the controller 212 via wirings. Further, the drain of the P-type MOS transistor Tr1 and the drain of the N-type MOS transistor Tr2 of the switching circuit 202 are connected to each other and connected as the output terminal to one end of the inductor 205 via a wiring. The drain of the P-type MOS transistor Tr1 and the drain of the N-type MOS transistor Tr2 of the switching circuit 203 are connected to each other and connected as the output terminal to one end of the inductor 207 via a wiring. The drain of the P-type MOS transistor Tr1 and the drain of the N-type MOS transistor Tr2 of the switching circuit 204 are connected to each other and connected as the output terminal to one end of the inductor 209 via a wiring. Note that the switching circuits 202, 203, 204 are not limited to those formed of CMOS inverters and may take other forms.

The controller 212 is a control unit that controls switching operations of the switching circuits 202, 203, 204 to switch on and off the switching circuits 202, 203, 204. The controller 212 controls the switching operation by controlling the voltages supplied to the gates of the P-type MOS transistors Tr1 and the gates of the N-type MOS transistors Tr2 of the switching circuits 202, 203, 204.

The inductors 205, 206, 207, 208, 209 have the same inductance value L. One end of the inductor 206 is connected to the other end of the inductor 205. One end of the inductor 208 is connected to the other end of the inductor 207. The other end of the inductor 206, the other end of the inductor 208, and the other end of the inductor 209 are connected to each other via wirings and connected to one end of the output line 222. In FIG. 2, current 214 illustrated by an arrow represents current occurring in a wiring connected between the other end of the inductor 206 and one end of the output line 222. Current 215 illustrated by an arrow represents current occurring in a wiring connected between the other end of the inductor 208 and one end of the output line 222. Current 216 illustrated by an arrow represents current occurring in a wiring connected between the other end of the inductor 209 and one end of the output line 222.

The output line 222 is a wiring for supplying a DC voltage to a load 211 such as a semiconductor apparatus or the like. The load 211 is connected to the other end of the output line 222. The capacitor 210 is connected between the output line 222 and the reference potential 213 via wirings. In FIG. 2, current 217 illustrated by an arrow represents current occurring in the output line 222 upstream of the capacitor 210.

The DC/DC converter 20 switches on and off the power, which is supplied from the input voltage source 201 to the input line 221, through switching operations of the switching circuits 202, 203, 204 to feed the power to the downstream inductors 205, 206, 207, 208, 209. Furthermore, the DC/DC converter 20 smooths power fed through the inductors 205, 206, 207, 208, 209 at the capacitor 210 to supply a desired constant voltage to the load 211. At this time, the controller 212 controls timings of the switching operations of the switching circuits 202, 203, 204.

The switching circuit 202 and the inductors 205, 206 form a first channel, which is a unit of configuration that functions as a DC/DC converter. The switching circuit 203 and the inductors 207, 208 form a second channel, which is a unit of configuration that functions as a DC/DC converter. The switching circuit 204 and the inductor 209 form a third channel, which is a unit of configuration that functions as a DC/DC converter. The DC/DC converter 20 has three channels of the first channel, the second channel, and the third channel.

In the DC/DC converter 20 according to the present embodiment, the inductor 105 and the inductor 106 of the DC/DC converter 10 according to the first embodiment illustrated in FIG. 1A are replaced with the two inductors 205, 206 and the two inductors 207, 208, respectively. In addition, in the present embodiment, the inductors 205, 206, 207, 208, 209 all have the same inductance value L. For example, when $L=0.1\ \mu H$, the operation waveforms of the DC/DC converter 20 according to the present embodiment will be the same as the operation waveforms illustrated in FIG. 1B and FIG. 1C. That is, also in the present embodiment, the same effect of ripple noise reduction as that in the first embodiment can be obtained.

As described above, in the present embodiment, the inductors 205, 206 of the first channel are equivalent to two inductors connected in series each being the same as the inductor 209 of the third channel. Further, the inductors 207, 208 of the second channel are also equivalent to two inductors connected in series each being the same as the inductor 209 of the third channel.

Furthermore, in the present embodiment, when the inductors 205, 206, 207, 208, 209 are formed of components, there is an advantage that these inductors can be formed of the same components. In general, there are limited lineups of inductor components in which one inductance value is integer multiple of another. In the present embodiment, two inductance components having the same inductance value are connected in series to make a double value, which makes it easier to accurately match the amplitude of the combined current of the first and second channels to the amplitude of the current of the third channel.

Note that the inductors of the first channel and the inductors of the second channel are not limited to two inductors connected in series each being the same as the inductor 209 of the third channel and may be formed of a plurality thereof connected in series, respectively. Also in such a case, the effect of ripple noise reduction can be obtained.

Third Embodiment

Figure 3A:
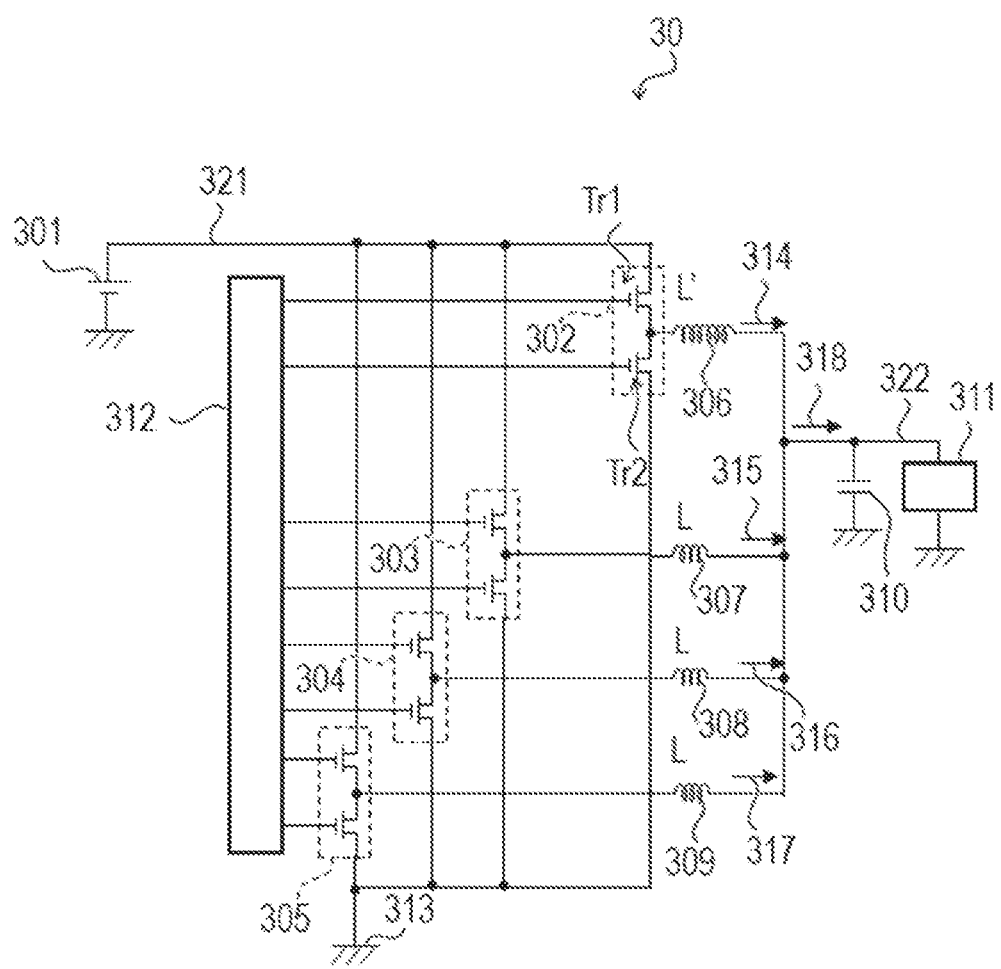
FIG. 3A is a circuit diagram illustrating a circuit of a DC/DC converter according to a comparative form.

Prior to description of a DC/DC converter 40 according to the third embodiment of the present disclosure, a DC/DC converter 30 according to a comparative form to be compared to the DC/DC converter 40 according to the third embodiment will be described with reference to FIG. 3A to FIG. 3F. FIG. 3A is a circuit diagram illustrating the circuit of the DC/DC converter 30 according to the comparative form. The DC/DC converter 30 according to the comparative form is a four-channel multiphase DC/DC converter. FIG. 3B to FIG. 3F are diagrams illustrating examples of operation waveforms of the DC/DC converter 30 according to the comparative form.

As illustrated in FIG. 3A, the DC/DC converter 30 according to the comparative form has switching circuits 302, 303, 304, 305, inductors 306, 307, 308, 309, a capacitor 310, and a controller 312. Further, the DC/DC converter 30 has an input line 321 and an output line 322.

The switching circuits 302, 303, 304, 305 are each formed of a CMOS inverter in the same manner as the switching circuits 102, 103, 104. In each of the switching circuits 302, 303, 304, 305, the source of the P-type MOS transistor Tr1 is connected to the other end of the input line 321 via a wiring. Further, the source of the N-type MOS transistor Tr2 is connected to a reference potential 313, which is the ground potential, via a wiring. Furthermore, the gate of the P-type MOS transistor Tr1 and the gate of the N-type MOS transistor Tr2 are connected to the controller 312 via wirings. Further, the drain of the P-type MOS transistor Tr1 and the drain of the N-type MOS transistor Tr2 of the switching circuit 302 are connected to each other and connected as the output terminal to one end of the inductor 306 via a wiring. The drain of the P-type MOS transistor Tr1 and the drain of the N-type MOS transistor Tr2 of the switching circuit 303 are connected to each other and connected as the output terminal to one end of the inductor 307 via a wiring. The drain of the P-type MOS transistor Tr1 and the drain of the N-type MOS transistor Tr2 of the switching circuit 304 are connected to each other and connected as the output terminal to one end of the inductor 308 via a wiring. The drain of the P-type MOS transistor Tr1 and the drain of the N-type MOS transistor Tr2 of the switching circuit 305 are connected to each other and connected as the output terminal to one end of the inductor 309 via a wiring.

The controller 312 is a control unit that controls switching operations of the switching circuits 302, 303, 304, 305 to switch on and off the switching circuits 302, 303, 304, 305. The controller 312 controls the switching operation by controlling the voltages supplied to the gates of the P-type MOS transistors Tr1 and the gates of the N-type MOS transistors Tr2 of the switching circuits 302, 303, 304, 305.

The inductor 306 has an inductance value L'. The inductors 307, 308, 309 each have an inductance value L that is smaller than the inductance value L'. The other end of the inductor 306, the other end of the inductor 307, the other end of the inductor 308, and the other end of the inductor 309 are connected to each other via wirings and connected to one end of the output line 322. In FIG. 3A, current 314 illustrated by an arrow represents current occurring in a wiring connected between the other end of the inductor 306 and one end of the output line 322. Current 315 illustrated by an arrow represents current occurring in a wiring connected between the other end of the inductor 307 and one end of the output line 322. Current 316 illustrated by an arrow represents current occurring in a wiring connected between the other end of the inductor 308 and one end of the output line 322. Current 317 illustrated by an arrow represents current occurring in a wiring connected between the other end of the inductor 309 and one end of the output line 322.

The output line 322 is a wiring for supplying a DC voltage to a load 311 such as a semiconductor apparatus or the like. The load 311 is connected to the other end of the output line 322. The capacitor 310 is connected between the output line 322 and the reference potential 313 via wirings. In FIG. 3A, current 318 illustrated by an arrow represents current occurring in the output line 322 upstream of the capacitor 310.

The DC/DC converter 30 switches on and off the power, which is supplied from the input voltage source 301 to the input line 321, through switching operations of the switching circuits 302, 303, 304, 305 to feed the power to the downstream inductors 306, 307, 308, 309. Furthermore, the DC/DC converter 30 smooths power fed through the inductors 306, 307, 308, 309, at the capacitor 310 to supply a desired constant voltage to the load 311. At this time, the controller 312 controls timings of the switching operations of the switching circuits 302, 303, 304, 305.

The switching circuit 302 and the inductor 306 form a first channel, which is a unit of configuration that functions as a DC/DC converter. The switching circuit 303 and the inductor 307 form a second channel, which is a unit of configuration that functions as a DC/DC converter. The switching circuit 304 and the inductor 308 form a third channel, which is a unit of configuration that functions as a DC/DC converter. The switching circuit 305 and the inductor 309 form a fourth channel, which is a unit of configuration that functions as a DC/DC converter. The DC/DC converter 30 has four channels of the first channel, the second channel, the third channel, and the fourth channel.

In a case of a light-load state, such as when the load 311 is in a standby state or the like, only the first channel formed of the switching circuit 302 and the inductor 306 having the larger inductance value L' is activated in the DC/DC converter 30. At this time, the remaining channels are deactivated. In the case of the light-load state, first current flows in the load 311 as the load current in accordance with the state of the load 311. In the case of the light-load state, the controller 312 controls the switching circuits 302, 303, 304, 305 so that only the first channel is activated and the second, third, and fourth channels are deactivated.

On the other hand, in a case of a heavy-load state, such as when the load 311 is in a full operating state, all the channels of the first, second, third, and fourth channels are activated in the DC/DC converter 30. At this time, however, respective channels are operated with a phase difference of 90 degrees from each other. In the case of the heavy-load state, second current that is larger than the first current flows in the load 311 as the load current in accordance with the state of the load 311. In the case of the heavy-load state, the controller 312 controls the switching circuits 302, 303, 304, 305 so that the first, second, third, and fourth channels are operated with a phase shift by 90 degrees from the each other.

Next, the current of each part of the DC/DC converter 30 and the voltage of the load 311 according to the comparative form illustrated in FIG. 3A will be described with reference to FIG. 3B, FIG. 3C, FIG. 3D, FIG. 3E, and FIG. 3F. FIG. 3B, FIG. 3C, FIG. 3D, FIG. 3E, and FIG. 3F illustrate examples of operation waveforms of the DC/DC converter 30 illustrated in FIG. 3A. Herein, for waveform analysis of the current and the voltage, the circuit simulator PSpice by Cadence Design Systems was used. Circuit conditions for the waveform analysis were that the voltage of the input voltage source 301 was 3 V, the inductance value L' of the inductor 306 was 0.2 µH, the inductance value L of the inductors 307, 308, 309 was 0.1 µH, and the switching frequency was 4 MHz.

Figure 3B:
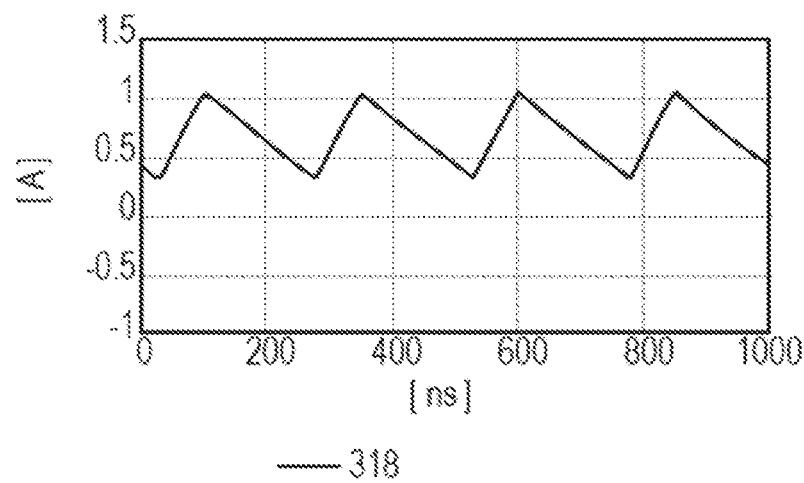
FIG. 3B is a diagram illustrating an example of an operation waveform of the DC/DC converter according to the comparative form.
Figure 3C:
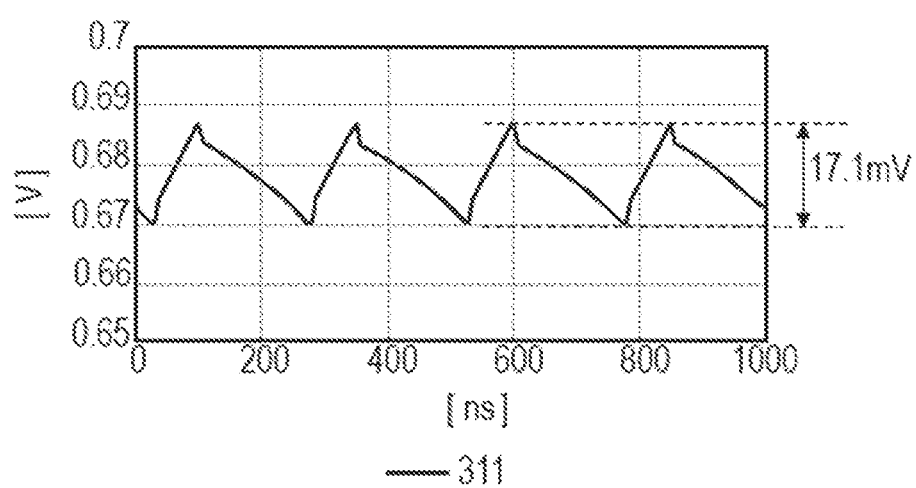
FIG. 3C is a diagram illustrating an example of an operation waveform of the DC/DC converter according to the comparative form.
Figure 3D:
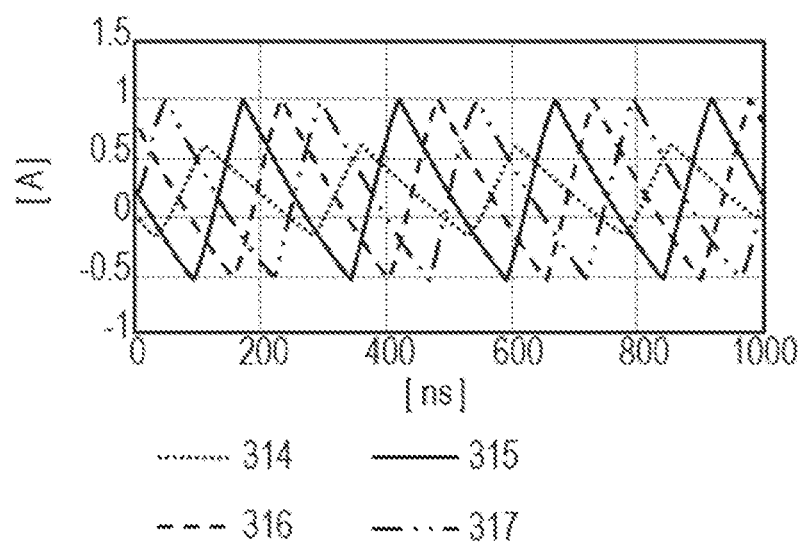
FIG. 3D is a diagram illustrating an example of an operation waveform of the DC/DC converter according to the comparative form.
Figure 3E:
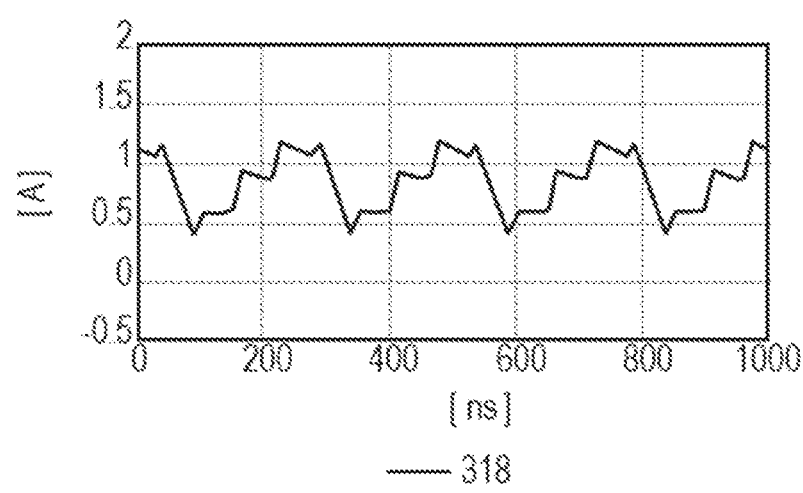
FIG. 3E is a diagram illustrating an example of an operation waveform of the DC/DC converter according to the comparative form.
Figure 3F:
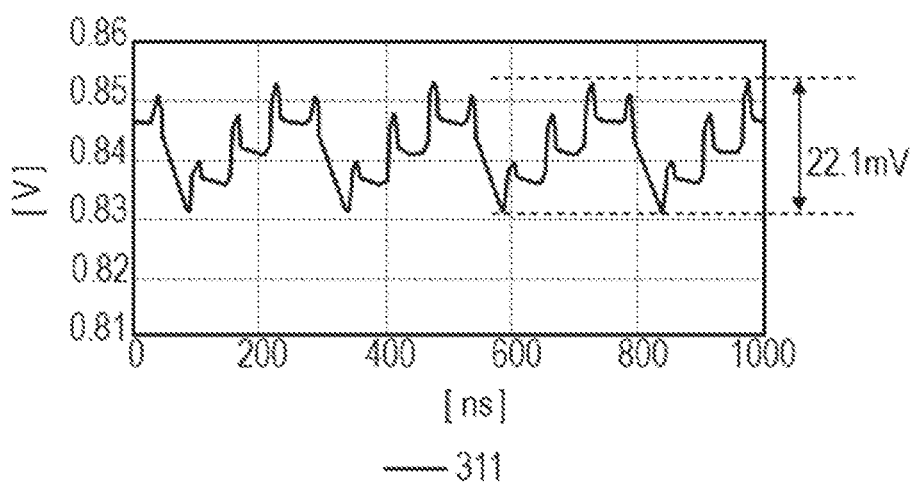
FIG. 3F is a diagram illustrating an example of an operation waveform of the DC/DC converter according to the comparative form.

FIG. 3B and FIG. 3C illustrate the waveforms of the current 318 and the voltage of the load 311 when only the first channel is activated in a light-load state, respectively. FIG. 3D, FIG. 3E, and FIG. 3F illustrate the waveforms of the current 314, 315, 316, 317, current 318, and the voltage of the load 311 when all the four channels are activated in a heavy-load state, respectively.

As can be seen from FIG. 3D, in the heavy-load state, although the phase difference between respective current 314, 315, 316, 317 is 90 degrees, only the current 314 of the inductor 306 having a larger inductance value than the remaining inductors 307, 308, 309 has a smaller amplitude.

Thus, as illustrated in FIG. 3E, the current 318, which is the combined current that is a combination of the current 314, 315, 316, 317, has a waveform with a small cancelling effect. As a result, as illustrated in FIG. 3F, the ripple noise in the voltage of the load 311 was 22.1 mV.

Figure 4A:
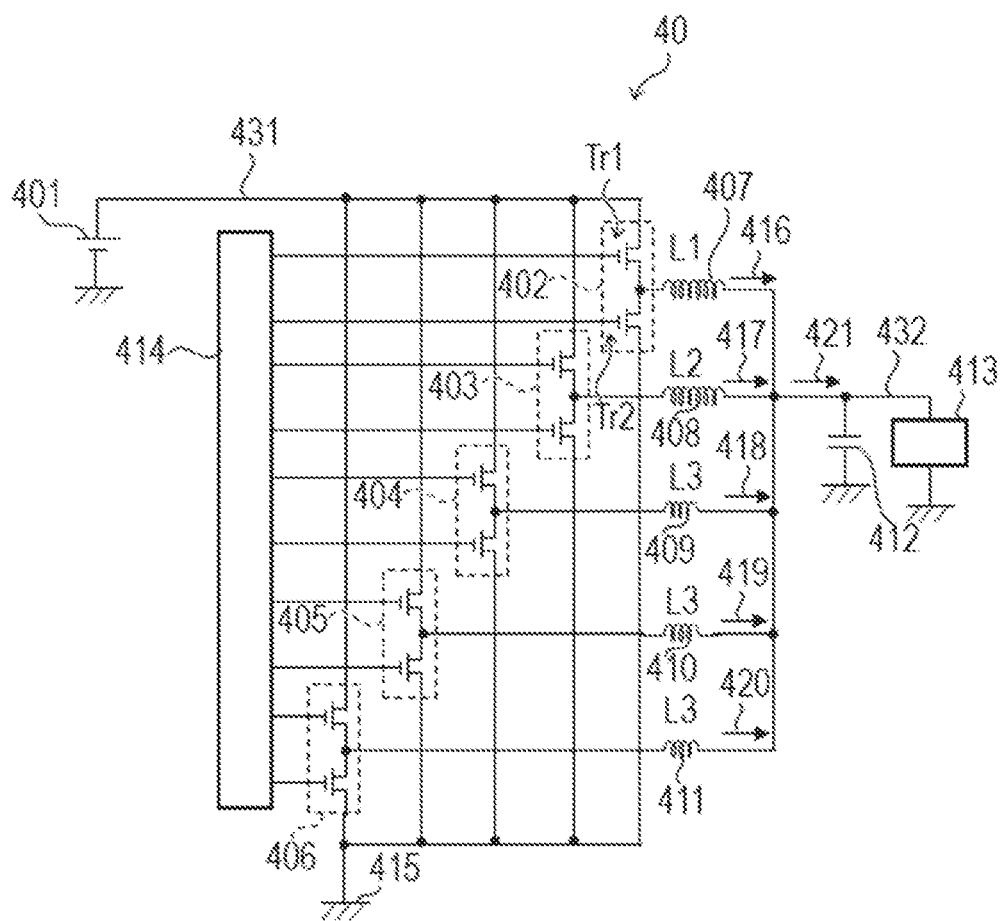
FIG. 4A is a circuit diagram illustrating a circuit of a DC/DC converter according to a third embodiment of the present disclosure.

Next, the DC/DC converter 40 according to the third embodiment of the present disclosure will be described with reference to FIG. 4A to FIG. 4F. FIG. 4A is a circuit diagram illustrating the circuit of the DC/DC converter 40 according to the present embodiment. FIG. 4B to FIG. 4F are diagrams illustrating examples of operation waveforms of the DC/DC converter 40 according to the present embodiment.

As illustrated in FIG. 4A, the DC/DC converter 40 according to the present embodiment has switching circuits 402, 403, 404, 405, 406, inductors 407, 408, 409, 410, 411, a capacitor 412, and a controller 414. Further, the DC/DC converter 40 has an input line 431 and an output line 432.

The input line 431 is a wiring supplied with a DC voltage from an input voltage source 401. The input voltage source 401 is connected to one end of the input line 431. The input voltage source 401 is the same as the input voltage source 101. The switching circuits 402, 403, 404, 405, 406 are connected in parallel to the other end of the input line 431 via wirings.

The switching circuits 402, 403, 404, 405, 406 are each formed of a CMOS inverter in the same manner as the switching circuits 102, 103, 104. In each of the switching circuits 402, 403, 404, 405, 406, the source of the P-type MOS transistor Tr is connected to the other end of the input line 431 via a wiring. Further, the source of the N-type MOS transistor Tr2 is connected to a reference potential 415, which is the ground potential, via a wiring. Furthermore, the gate of the P-type MOS transistor Tr1 and the gate of the N-type MOS transistor Tr2 are connected to the controller 414 via wirings. Further, the drain of the P-type MOS transistor Tr1 and the drain of the N-type MOS transistor Tr2 of the switching circuit 402 are connected to each other and connected as the output terminal to one end of the inductor 407 via a wiring. The drain of the P-type MOS transistor Tr1 and the drain of the N-type MOS transistor Tr2 of the switching circuit 403 are connected to each other and connected as the output terminal to one end of the inductor 408 via a wiring. The drain of the P-type MOS transistor Tr1 and the drain of the N-type MOS transistor Tr2 of the switching circuit 404 are connected as the output terminal to each other and connected to one end of the inductor 409 via a wiring. The drain of the P-type MOS transistor Tr1 and the drain of the N-type MOS transistor Tr2 of the switching circuit 405 are connected to each other and connected as the output terminal to one end of the inductor 410 via a wiring. The drain of the P-type MOS transistor Tr and the drain of the N-type MOS transistor Tr2 of the switching circuit 406 are connected to each other and connected as the output terminal to one end of the inductor 411 via a wiring. Note that the switching circuits 402, 403, 404, 405, 406 are not limited to those formed of CMOS inverters and may take other forms.

The controller 414 is a control unit that controls switching operations of the switching circuits 402, 403, 404, 405, 406 to switch on and off the switching circuits 402, 403, 404, 405, 406. The controller 414 controls the switching operation by controlling the voltages supplied to the gates of the P-type MOS transistors Tr and the gates of the N-type MOS transistors Tr2 of the switching circuits 402, 403, 404, 405, 406.

The inductor 407 has an inductance value L1. The inductor 408 has an inductance value L2. The inductors 409, 410, 411 have the same inductance value L3. The inductance value L3 is a smaller than the inductance values L1, L2. The inductance values L1, L2 may be the same or may be different from each other. The other end of the inductor 407, the other end of the inductor 408, the other end of the inductor 409, the other end of the inductor 410, and the other end of the inductor 411 are connected to each other via wirings and connected to one end of the output line 432. In FIG. 4A, current 416 illustrated by an arrow represents current occurring in a wiring connected between the other end of the inductor 407 and one end of the output line 432. Current 417 illustrated by an arrow represents current occurring in a wiring connected between the other end of the inductor 408 and one end of the output line 432. Current 418 illustrated by an arrow represents current occurring in a wiring connected between the other end of the inductor 409 and one end of the output line 432. Current 419 illustrated by an arrow represents current occurring in a wiring connected between the other end of the inductor 410 and one end of the output line 432. Current 420 illustrated by an arrow represents current occurring in a wiring connected between the other end of the inductor 411 and one end of the output line 432.

The output line 432 is a wiring for supplying a DC voltage to a load 413 such as a semiconductor apparatus or the like. The load 413 is connected to the other end of the output line 432. The capacitor 412 is connected between the output line 432 and the reference potential 415 via wirings. In FIG. 4A, current 421 illustrated by an arrow represents current occurring in the output line 432 upstream of the capacitor 412.

The DC/DC converter 40 switches on and off the power, which is supplied from the input voltage source 401 to the input line 431, through switching operations of the switching circuits 402, 403, 404, 405, 406 to feed the power to the downstream inductors 407, 408, 409, 410, 411. Furthermore, the DC/DC converter 40 smooths power fed through the inductors 407, 408, 409, 410, 411 at the capacitor 412 to supply a desired constant voltage to the load 413. At this time, the controller 414 controls timings of the switching operations of the switching circuits 402, 403, 404, 405, 406.

The switching circuit 402 and the inductor 407 form a first channel, which is a unit of configuration that functions as a DC/DC converter. The switching circuit 403 and the inductor 408 form a second channel, which is a unit of configuration that functions as a DC/DC converter. The switching circuit 404 and the inductor 409 form a third channel, which is a unit of configuration that functions as a DC/DC converter. The switching circuit 405 and the inductor 410 form a fourth channel, which is a unit of configuration that functions as a DC/DC converter. The switching circuit 406 and the inductor 411 form a fifth channel, which is a unit of configuration that functions as a DC/DC converter. The DC/DC converter 40 has five channels of the first channel, the second channel, the third channel, the fourth channel, and the fifth channel.

In a case of a light-load state, such as when the load 413 is in a standby state or the like, only the first channel formed of the switching circuit 402 and the inductor 407 having the larger inductance value L1 is activated in the DC/DC converter 40. At this time, the remaining channels are deactivated. In the case of the light-load state, first current flows in the load 413 as the load current in accordance with the state of the load 413. In the case of the light-load state, the controller 414 controls the switching circuits 402, 403, 404, 405, 406 so that only the first channel is activated and the second, third, fourth, and fifth channels are deactivated.

On the other hand, in a case of a heavy-load state, such as when the load 413 is in a full operating state, all the channels of the first, second, third, fourth, and fifth channels are activated in the DC/DC converter 40. At this time, however, the first channel and the second channel, which is formed of the switching circuit 403 and the inductor 408 having the larger inductance value L2, are operated in-phase. On the other hand, the remaining third to fifth channels are operated with a phase shift by 90 degrees each from the phase in which the first and second channels are operated. In the case of the heavy-load state, the second current that is larger than the first current flows in the load 413 as the load current in accordance with the state of the load 413. In the case of the heavy-load state, the controller 414 controls the switching circuits 402, 403 so that the first and second channels are operated in-phase. Furthermore, in such a case, the controller 414 controls the switching circuits 404, 405, 406 so that the third, fourth, and fifth channels are operated with a phase shift by 90 degrees each from the phase in which the first and second channels are operated.

It is preferable that the inductance value L1 of the inductor 407 of the first channel, the inductance value L2 of the inductor 408 of the second channel, and the inductance value L3 of the inductors 409, 410, 411 of the third to fifth channels satisfy the following Expression (2).

$$L3=(L1 \times L2)/(L1+L2) \quad \text{Expression (2)}$$

When the inductance values L1, L2, L3 satisfy Expression (2), ripple noise can be more effectively reduced due to a cancelling effect between flows of current in a case of a heavy-load state as described later.

Next, the current of each part of the DC/DC converter 40 and the voltage of the load 413 according to the present embodiment illustrated in FIG. 4A will be described with reference to FIG. 4B, FIG. 4C, FIG. 4D, FIG. 4E, and FIG. 4F. FIG. 4B, FIG. 4C, FIG. 4D, FIG. 4E, and FIG. 4F illustrate examples of operation waveforms of the DC/DC converter 40 illustrated in FIG. 4A. Herein, for waveform analysis of the current and the voltage, the circuit simulator PSpice by Cadence Design Systems was used. Circuit conditions for the waveform analysis were that the voltage of the input voltage source 401 was 3 V, the inductance values L1, L2 of the inductors 407, 408 each were 0.2 μH, the inductance value L3 of the inductors 409, 410, 411 was 0.1 μH, and the switching frequency was 4 MHz.

Figure 4B:
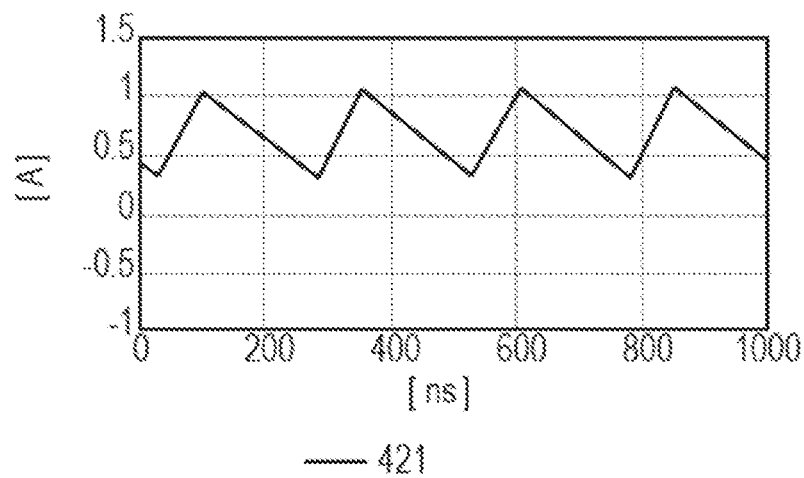
FIG. 4B is a diagram illustrating an example of an operation waveform of the DC/DC converter according to the third embodiment of the present disclosure.
Figure 4C:
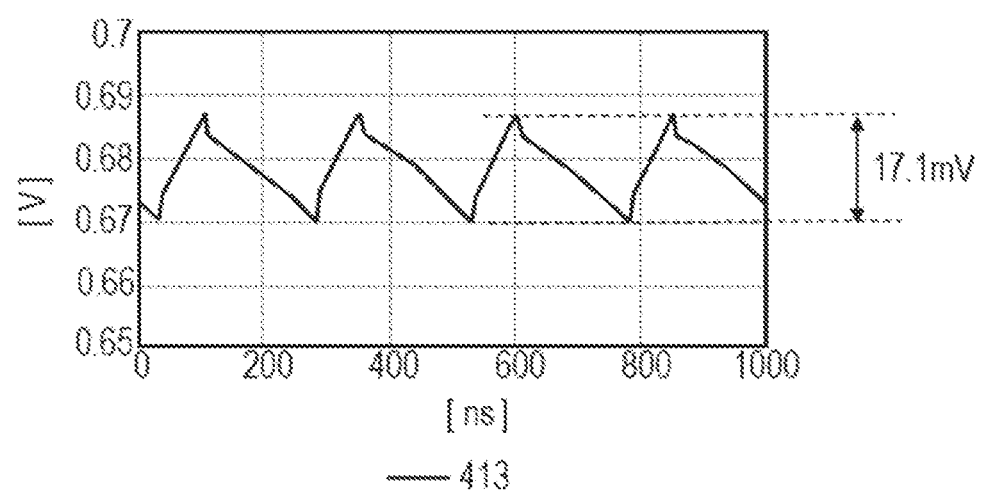
FIG. 4C is a diagram illustrating an example of an operation waveform of the DC/DC converter according to the third embodiment of the present disclosure.
Figure 4D:
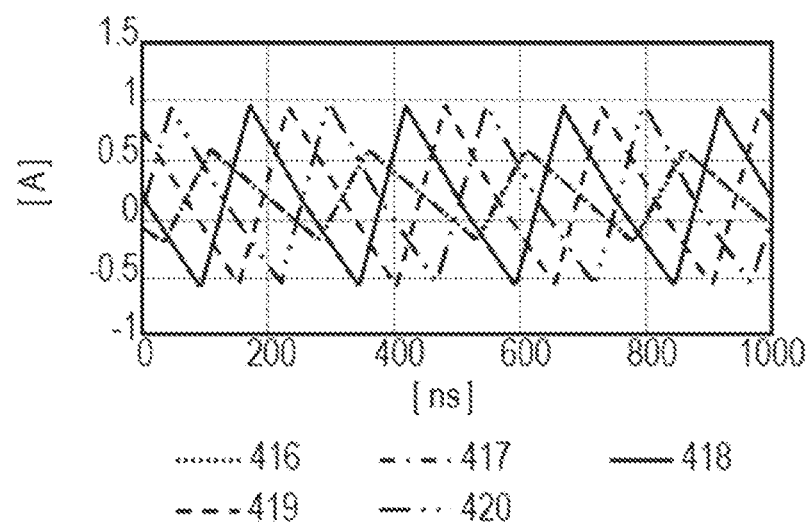
FIG. 4D is a diagram illustrating an example of an operation waveform of the DC/DC converter according to the third embodiment of the present disclosure.
Figure 4E:
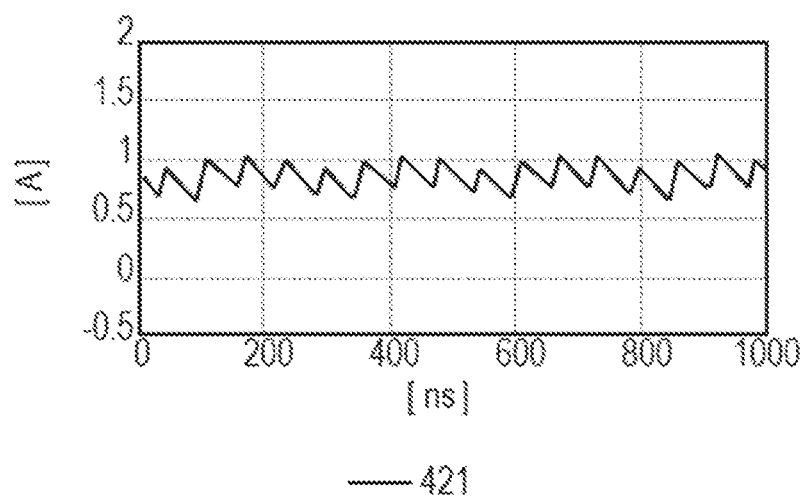
FIG. 4E is a diagram illustrating an example of an operation waveform of the DC/DC converter according to the third embodiment of the present disclosure.
Figure 4F:
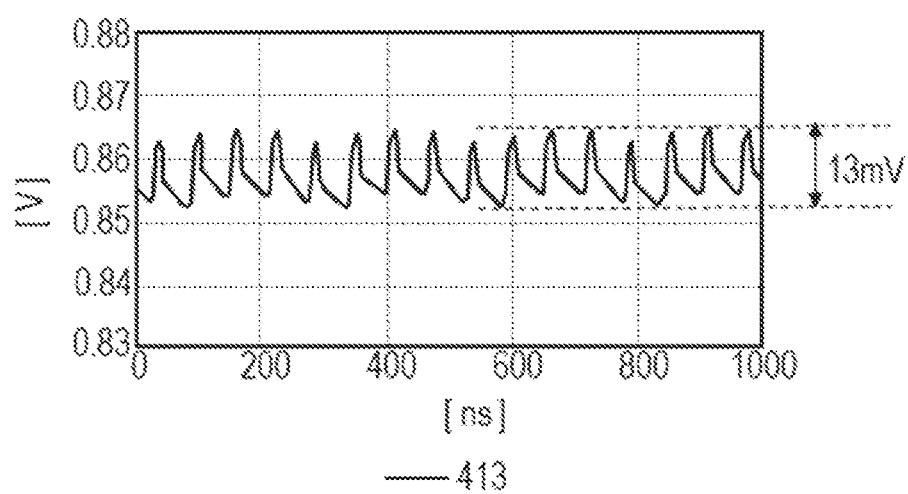
FIG. 4F is a diagram illustrating an example of an operation waveform of the DC/DC converter according to the third embodiment of the present disclosure.

FIG. 4B and FIG. 4C illustrate waveforms of the current 421 and the voltage of the load 413 when only the first channel is activated in a light-load state, respectively. FIG. 4D, FIG. 4E, and FIG. 4F illustrate waveforms of the current 416, 417, 418, 419, 420, the current 421, and the voltage of the load 413 when all the five channels are activated in a heavy-load state, respectively.

When all the five channels are activated in the heavy-load state, such as when the load 413 is in a full operating state, the current 416, 417 has waveforms having half the amplitude of the current 418, 419, 420, as illustrated in FIG. 4D. In FIG. 4D, the current 416 and the current 417 overlap each other. Therefore, the combined current of the current 416 and the current 417 has the same amplitude as the current 418, 419, 420, and the ripple noise is reduced due to the cancelling effect between the flows of current. While the ripple noise of the DC/DC converter 30 according to the comparative form illustrated in FIG. 3F is 22.1 mV, the ripple noise is reduced to 13 mV in the DC/DC converter 40 according to the present embodiment as illustrated in FIG. 4F.

Note that, when only the first channel is activated in a light-load state, the amplitude of ripple noise is 17.1 mV as illustrated in FIG. 4C in the DC/DC converter 40 according to the present embodiment. This result is the same as the result illustrated in FIG. 3C of the DC/DC converter 30 according to the comparative form.

As described above, according to the present embodiment, ripple noise in the output voltage can be reduced regardless of the level of load current.

Note that, although the case where the DC/DC converter 40 has the fourth and fifth channels including the inductors 410, 411 having the same inductance value as the inductor 409 of the third channel has been described in the present embodiment, the invention is not limited thereto. The DC/DC converter 40 can have N (N being an integer greater than or equal to one) channels including inductors having the same inductance value as the inductor 409 of the third channel, respectively. The configurations of the N channels are the same as the fourth channel, respectively. In such a case, the controller 414 controls switching circuits of the first, second, and third channels and the N channels. Accordingly, in a case of a heavy-load state, the controller 414 controls the switching circuit of each channel so that the third channel and the N channels are operated with a phase shift by 360/(N+2) degrees each from the phase in which the first and second channels are operated.

Further, also in the present embodiment, the inductor of the first channel and the inductor of the second channel may be formed of a plurality of inductors connected in series each being the same as the inductor of the third channel in the same manner as in the second embodiment.

Fourth Embodiment

A DC/DC converter according to the fourth embodiment of the present disclosure will be described with reference to FIG. 5A to FIG. 5E. FIG. 5A to FIG. 5E are diagrams illustrating operation waveforms of the DC/DC converter according to the present embodiment.

The configuration of the DC/DC converter according to the present embodiment is the same as the configuration of the DC/DC converter 40 according to the third embodiment illustrated in FIG. 4A. In the present embodiment, description will be provided for a case where circuit conditions differ from those of the fourth embodiment.

FIG. 5A, FIG. 5B, FIG. 5C, FIG. 5D, and FIG. 5E are diagrams illustrating operation waveforms when the circuit conditions of the DC/DC converter 40 illustrated in FIG. 4A are set as follows. Herein, for waveform analysis of the current and the voltage, the circuit simulator PSpice by Cadence Design Systems was used. Circuit conditions for the waveform analysis were that the voltage of the input voltage source 401 was 3 V, the inductance value L1 of the inductor 407 was 0.47 μH, the inductance value L2 of the inductor 408 was 0.13 μH, and the inductance value L3 of the inductors 409, 410, 411 was 0.1 μH. The switching frequency was 4 MHz.

As described above, in the present embodiment, the inductor 407 of the first channel has a larger inductance value than the inductor 408 of the second channel.

Figure 5A:
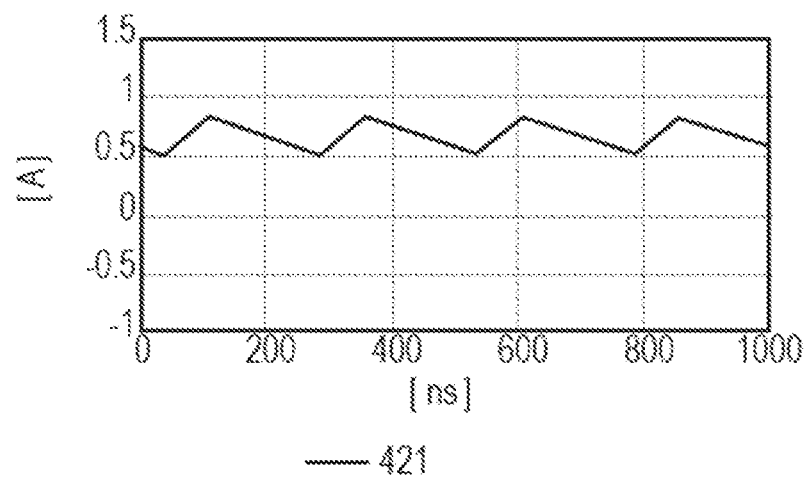
FIG. 5A is a diagram illustrating an example of an operation waveform of a DC/DC converter according to a fourth embodiment of the present disclosure.
Figure 5B:
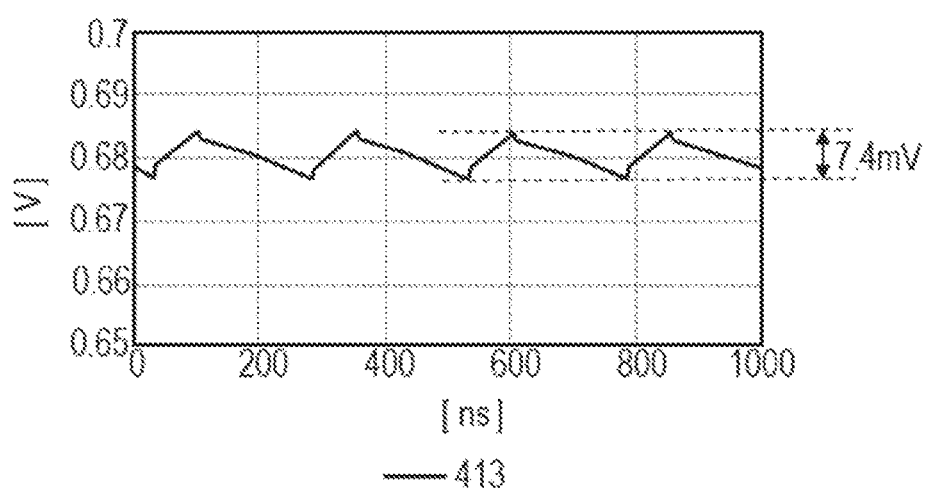
FIG. 5B is a diagram illustrating an example of an operation waveform of the DC/DC converter according to the fourth embodiment of the present disclosure.

FIG. 5A and FIG. 5B illustrate waveforms of the current 421 and the voltage of the load 413 when only the first channel is activated in a light-load state, respectively. In the present embodiment, due to an effect of the increase of the inductance value L1 of the inductor of the first channel from 0.2 μH to 0.47 μH, the amplitude of ripple noise is reduced from 17.1 mV to 7.4 mV as illustrated in FIG. 5B compared to the third embodiment illustrated in FIG. 4B and FIG. 4C.

Figure 5C:
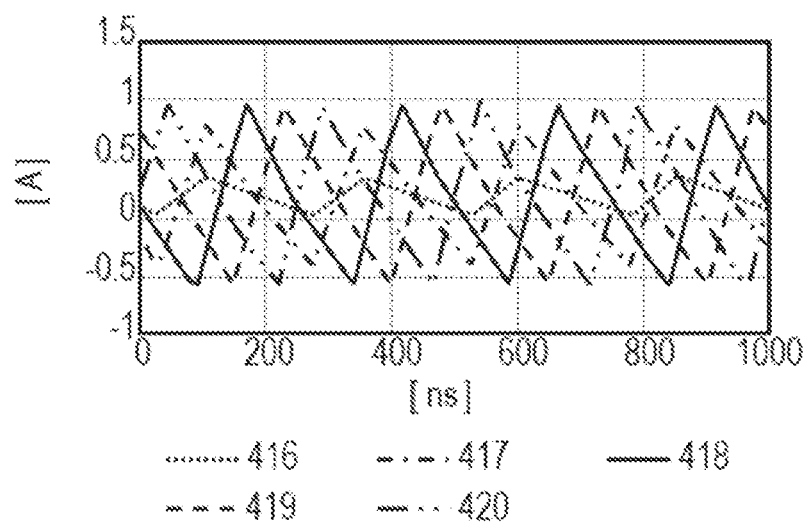
FIG. 5C is a diagram illustrating an example of an operation waveform of the DC/DC converter according to the fourth embodiment of the present disclosure.
Figure 5D:
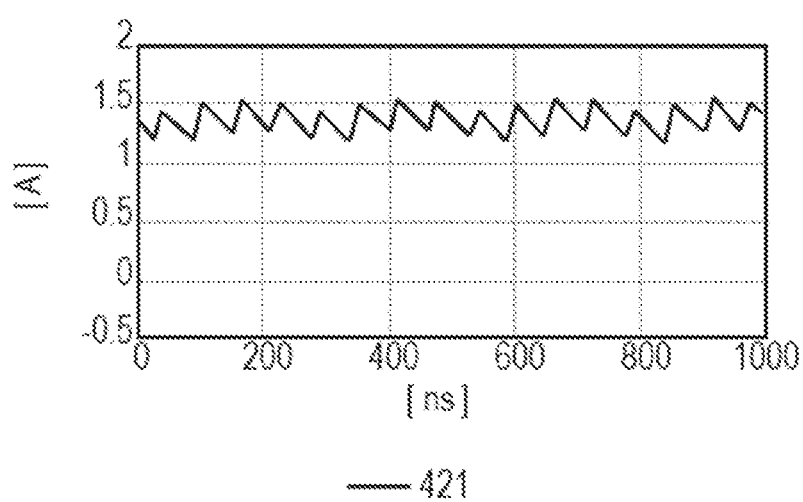
FIG. 5D is a diagram illustrating an example of an operation waveform of the DC/DC converter according to the fourth embodiment of the present disclosure.
Figure 5E:
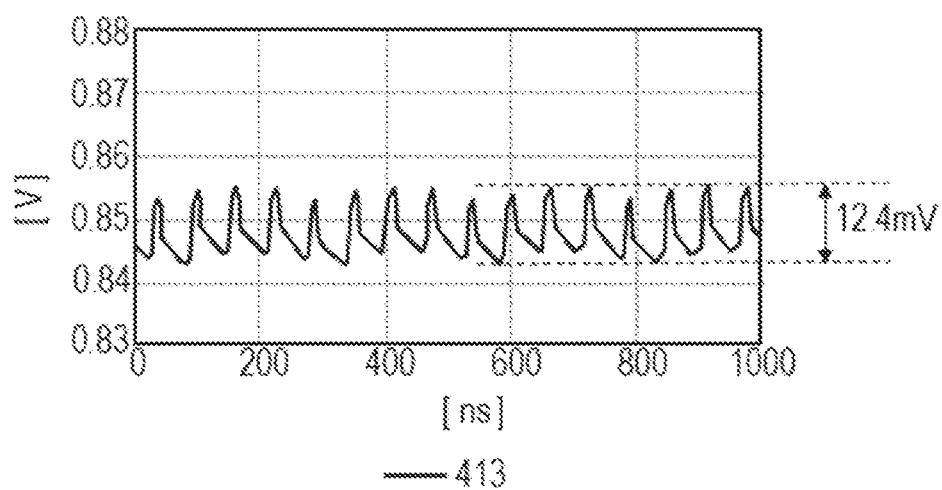
FIG. 5E is a diagram illustrating an example of an operation waveform of the DC/DC converter according to the fourth embodiment of the present disclosure.

On the other hand, FIG. 5C, FIG. 5D, and FIG. 5E illustrate the current 416, 417, 418, 419, 420, the current 421, and the voltage of the load 413 when all the five channels are activated in a heavy-load state, respectively. As illustrated in FIG. 5C, while the current 416 and the current 417 have the same phase and different amplitudes, the sum of both the amplitudes is equal to the amplitude of the current 418, 419, 420. Therefore, the combined current of the current 416, 417 and the remaining current 418, 419, 420 have the same amplitude with a phase difference of 90 degrees, respectively. Thus, due to the cancelling effect between the flows of current, the current 421 that is the combined current of all the current 416, 417, 418, 419, 420 is reduced as illustrated in FIG. 5D. As a result, in the present embodiment, the amplitude of ripple noise is 12.4 mV as illustrated in FIG. 5E, which is substantially the same as the amplitude of ripple noise of 13 mV illustrated in FIG. 4F of the third embodiment.

As described above, in the present embodiment, the ripple noise in a light-load state can be further reduced compared to the third embodiment.

Note that, also in the present embodiment, the inductor of the first channel and the inductor of the second channel may be formed of a plurality of inductors connected in series each being the same as the inductor of the third channel in the same manner as in the second embodiment.

Fifth Embodiment

Figure 6A:
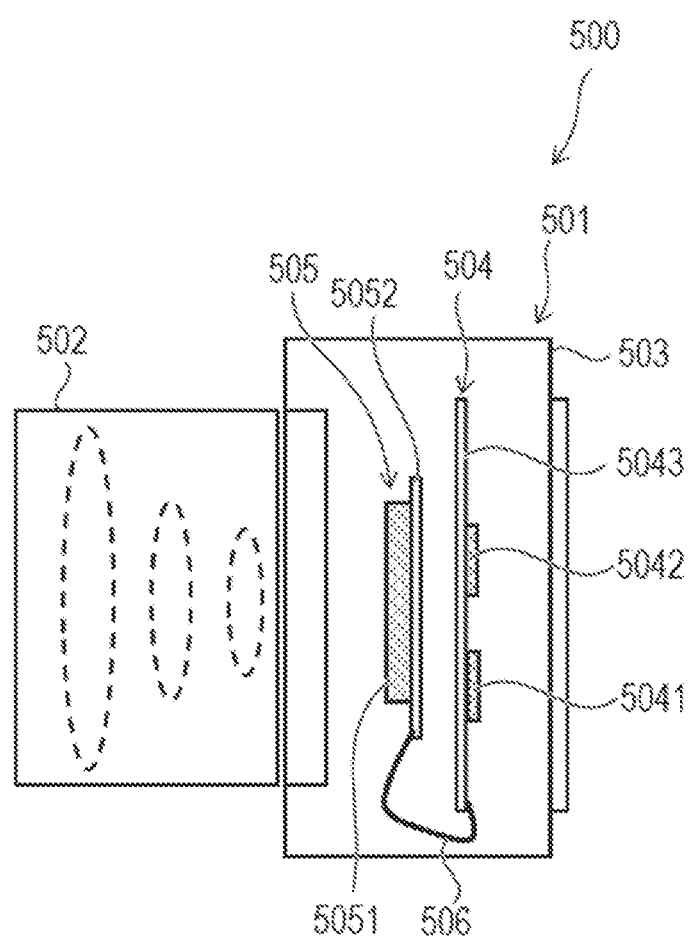
FIG. 6A is a sectional view illustrating a digital camera that is an imaging apparatus as one example of an electronic apparatus according to a fifth embodiment of the present disclosure.
Figure 6B:
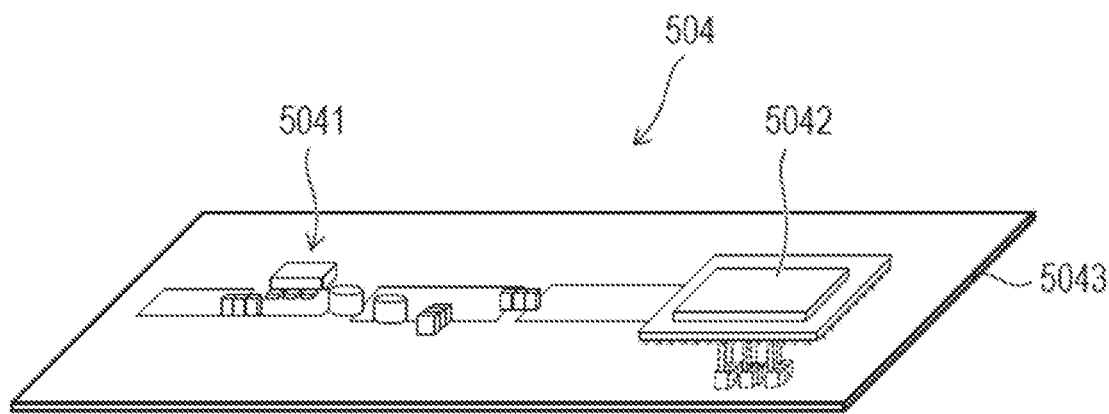
FIG. 6B is a perspective view illustrating a processing module in the digital camera that is the imaging apparatus as one example of the electronic apparatus according to the fifth embodiment of the present disclosure.
Figure 6C:
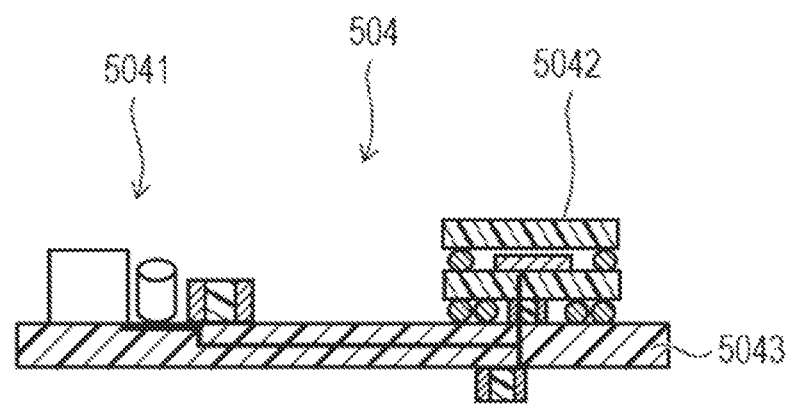
FIG. 6C is a sectional view illustrating the processing module in the digital camera that is the imaging apparatus as one example of the electronic apparatus according to the fifth embodiment of the present disclosure.

An electronic apparatus according to the fifth embodiment of the present disclosure will be described with reference to FIG. 6A to FIG. 6C. FIG. 6A is a sectional view illustrating a digital camera 500 that is an imaging apparatus as an example of the electronic apparatus according to the present embodiment. FIG. 6B and FIG. 6C are a perspective view and a sectional view illustrating a processing module 504 included in the digital camera 500, respectively. In the present embodiment, the digital camera 500 that is an electronic apparatus including any one of the DC/DC converters 10, 20, 40 according to the first to fourth embodiments described above will be described.

As illustrated in FIG. 6A, the digital camera 500 that is the imaging apparatus as an example of the electronic apparatus according to the present embodiment is an interchangeable lens digital camera, for example, and has a camera body 501. A lens barrel (lens unit) 502 including lenses is removably attached to the camera body 501. Note that the digital camera 500 is not limited to the interchangeable lens type and may be an integrated lens type, for example.

The camera body 501 has a casing 503, the processing module 504 that is a printed circuit board, and a sensor module 505 that is a printed circuit board. The processing module 504 and the sensor module 505 are arranged inside the casing 503. The processing module 504 and the sensor module 505 are electrically connected to each other via the cable 506. The processing module 504 and the sensor module 505 are examples of a semiconductor module that is an electronic module.

The sensor module 505 has an image sensor 5051 that is an image pickup device and a printed wiring board 5052. The image sensor 5051 is mounted and implemented on the printed wiring board 5052. For example, the image sensor 5051 is a complementary metal oxide semiconductor (CMOS) image sensor or a charge coupled device (CCD) image sensor. The image sensor 5051 has a function of converting light incident via the lens unit 502 into an electrical signal.

As illustrated in FIG. 6B and FIG. 6C, the processing module 504 has a semiconductor apparatus 5041 that is, for example, an application specific integrated circuit (ASIC), a power source circuit 5042, and a printed wiring board 5043. The semiconductor apparatus 5041 and the power source circuit 5042 are mounted and implemented on the printed wiring board 5043. For example, the printed wiring board 5043 is a rigid substrate, which is a member on which the semiconductor apparatus 5041 and the power source circuit 5042 are mounted. The semiconductor apparatus 5041 is a digital signal processor, for example, and has a function of acquiring an electrical signal from the image sensor 5051 and performing a process of correcting the acquired electrical signal to generate image data. The power source circuit 5042 is formed of any one of the DC/DC converters 10, 20, 40 according to the first to fourth embodiments. The power source circuit 5042 converts a DC voltage supplied from a battery (not illustrated) into a predetermined voltage and supplies the predetermined voltage to the semiconductor apparatus 5041.

Note that, although the digital camera 500 has been described as the electronic apparatus in the present embodiment, the invention is not limited thereto. Electronic apparatuses including any one of the DC/DC converters 10, 20, 40 may be any electronic apparatuses other than a digital camera.

According to various embodiments of the present disclosure, ripple noise in the output voltage can be reduced regardless of the level of load current.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-089697, filed Jun. 1, 2022, which is hereby incorporated by reference herein in its entirety.

What is claimed is:

1. A DC/DC converter comprising:
   an input line supplied with a DC voltage;
   a plurality of channels each including a switching circuit and an inductor, one end of the inductor being connected to the input line via the switching circuit;
   an output line, one end of the output line being connected to the other end of the inductors of the plurality of channels, and the other end of the output line being connected to a load; and
   a controller that controls the switching circuits of the plurality of channels,
   wherein the plurality of channels include at least a first channel, a second channel, and a third channel,
   wherein the inductors of the first and second channels each have a larger inductance value than an inductance value of the inductor of the third channel,
   wherein in a case where a current flowing in the load is a first current, the controller controls the switching circuits of the first to third channels so that only the first channel is activated and the second and third channels are deactivated, and
   wherein in a case where the current flowing in the load is a second current that is larger than the first current, the controller controls the switching circuits of the first to third channels so that the first and second channels are operated in-phase and the third channel is operated in a phase different from the phase of the first and second channels.

2. The DC/DC converter according to claim 1, wherein in a case where the current flowing in the load is the second current that is larger than the first current, the controller controls the switching circuits of the first to third channels so that the third channel is operated with a phase difference of 180 degrees relative to the first and second channel.

3. The DC/DC converter according to claim 1,
wherein the plurality of channels further includes N channels, where N is an integer greater than or equal to one, and
wherein each inductor of the N channels has an inductance value that is the same as the inductance value of the inductor of the third channel.

4. The DC/DC converter according to claim 3, wherein in a case where the current flowing in the load is the second current that is larger than the first current, the controller controls the switching circuits of the first to third channels and switching circuits of the N channels so that the first channel and the second channel are operated in-phase and the third channel and the N channels are operated with a phase shift by 360/(N+2) degrees each from the phase in which the first and second channels are operated.

5. The DC/DC converter according to claim 3, wherein the inductor of the first channel has a larger inductance value than an inductance value of the inductor of the second channel.

6. The DC/DC converter according to claim 1, wherein the inductors of the first and second channels are each formed of a plurality of inductors connected in series each being the same as the inductor of the third channel.

7. An electronic module comprising:
a member; and
a DC/DC converter according to claim 1, the DC/DC converter being mounted on the member.

8. An electronic apparatus comprising:
a casing; and
an electronic module arranged inside the casing,
wherein the electronic module comprises:
a member; and
a DC/DC converter according to claim 1, the DC/DC converter being mounted on the member.

9. A DC/DC converter comprising:
an input line supplied with a DC voltage;
a plurality of channels each including a switching circuit and an inductor, one end of the inductor being connected to the input line via the switching circuit;
an output line, one end of the output line being connected to the other end of the inductors of the plurality of channels, and the other end of the output line being connected to a load; and
a controller that controls the switching circuits of the plurality of channels,
wherein the plurality of channels include at least a first channel, a second channel, and a third channel,
wherein the inductors of the first and second channels each have a larger inductance value than an inductance value L3 of the inductor of the third channel,
wherein in a case where a current flowing in the load is a first current, the controller controls the switching circuits of the first to third channels so that only the first channel is activated and the second and third channels are deactivated, wherein in a case where the current flowing in the load is a second current that is larger than the first current, the controller controls the switching circuits of the first to third channels so that the first and second channels are operated in-phase and the third channel is operated in a phase different from the phase of the first and second channels, and
wherein an inductance value L1 of the inductor of the first channel, an inductance value L2 of the inductor of the second channel, and the inductance value L3 of the inductor of the third channel satisfy following Expression (1):

$$L3=(L1 \times L2)/(L1+L2) \tag{1}$$

10. The DC/DC converter according to claim 9, wherein in a case where the current flowing in the load is the second current that is larger than the first current, the controller controls the switching circuits of the first to third channels so that the third channel is operated with a phase difference of 180 degrees relative to the first and second channels.

11. The DC/DC converter according to claim 9,
wherein the plurality of channels further includes N channels, where N is an integer greater than or equal to one, and
wherein each inductor of the N channels has an inductance value that is the same as the inductance value L3 of the inductor of the third channel.

12. The DC/DC converter according to claim 11, wherein, in a case where the current flowing in the load is the second current that is larger than the first current, the controller controls the switching circuits of the first to third channels and switching circuits of the N channels so that the first channel and the second channel are operated in-phase and the third channel and the N channels are operated with a phase shift by 360/(N+2) degrees each from the phase in which the first and second channels are operated.

13. The DC/DC converter according to claim 11, wherein the inductance value L1 of the inductor of the first channel is larger than the inductance value L2 of the inductor of the second channel.

14. The DC/DC converter according to claim 9, wherein the inductors of the first and second channels are each formed of a plurality of inductors connected in series each being the same as the inductor of the third channel.

15. An electronic module comprising:
a member; and
a DC/DC converter according to claim 9, the DC/DC converter being mounted on the member.

16. An electronic apparatus comprising:
a casing; and
an electronic module arranged inside the casing,
wherein the electronic module comprises:
a member; and
a DC/DC converter according to claim 9, the DC/DC converter being mounted on the member.

17. A DC/DC converter comprising:
an input line supplied with a DC voltage;
a plurality of channels each including a switching circuit and an inductor, one end of the inductor being connected to the input line via the switching circuit;
an output line, one end of the output line being connected to the other end of the inductors of the plurality of channels, and the other end of the output line being connected to a load; and
a controller that controls the switching circuits of the plurality of channels, wherein the plurality of channels include at least a first channel, a second channel, and a third channel, wherein the inductors of the first and second channels each have a larger inductance value than an inductance value L3 of the inductor of the third channel, wherein in a case where a current flowing in the load is a first current, the controller controls the switching circuits of the first to third channels so that only the first channel is activated and the second and third channels are deactivated, wherein in a case where the current flowing in the load is a second current that is larger than the first current, the controller controls the switching circuits of the first to third channels so that the first and second channels are operated in-phase and the third channel is operated in a phase different from the phase of the first and second channels, wherein the plurality of channels further includes N channels, where N is an integer greater than or equal to one, wherein each inductor of the N channels has an inductance value that is the same as the inductance value L3 of the inductor of the third channel, and wherein an inductance value L1 of the inductor of the first channel, an inductance value L2 of the inductor of the second channel, and the inductance value L3 of the inductor of the third channel satisfy following Expression (2):

$$L3=(L1 \times L2)/(L1+L2) \qquad (2).$$

18. The DC/DC converter according to claim 17, wherein in a case where the current flowing in the load is the second current that is larger than the first current, the controller controls the switching circuits of the first to third channels so that the third channel is operated with a phase difference of 180 degrees relative to the first and second channels.

19. The DC/DC converter according to claim 17, wherein, in a case where the current flowing in the load is the second current that is larger than the first current, the controller controls the switching circuits of the first to third channels and switching circuits of the N channels so that the first channel and the second channel are operated in-phase and the third channel and the N channels are operated with a phase shift by 360/(N+2) degrees each from the phase in which the first and second channels are operated.

20. The DC/DC converter according to claim 17, wherein the inductance value L1 of the inductor of the first channel is larger than the inductance value L2 of the inductor of the second channel.

21. The DC/DC converter according to claim 17, wherein the inductors of the first and second channels are each formed of a plurality of inductors connected in series each being the same as the inductor of the third channel.

22. An electronic module comprising:
a member; and
a DC/DC converter according to claim 19, the DC/DC converter being mounted on the member.

23. An electronic apparatus comprising:
a casing; and
an electronic module arranged inside the casing,
wherein the electronic module comprises:
a member; and
a DC/DC converter according to claim 17, the DC/DC converter being mounted on the member.

* * * * *